(12) United States Patent
Chen et al.

(10) Patent No.: US 12,074,755 B2
(45) Date of Patent: Aug. 27, 2024

(54) BEAM RECOVERY METHOD AND APPARATUS, AND TERMINAL AND STORAGE MEDIUM

(71) Applicant: ZTE CORPORATION, Guangdong (CN)

(72) Inventors: Yijian Chen, Guangdong (CN); Zhaohua Lu, Guangdong (CN); Shujuan Zhang, Guangdong (CN); Bo Gao, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 614 days.

(21) Appl. No.: 17/278,368

(22) PCT Filed: Sep. 19, 2019

(86) PCT No.: PCT/CN2019/106749
§ 371 (c)(1),
(2) Date: Mar. 22, 2021

(87) PCT Pub. No.: WO2020/057612
PCT Pub. Date: Mar. 26, 2020

(65) Prior Publication Data
US 2021/0359902 A1     Nov. 18, 2021

(30) Foreign Application Priority Data

Sep. 21, 2018  (CN) .......................... 201811110643.6

(51) Int. Cl.
*H04L 41/0668* (2022.01)
*H04B 7/06* (2006.01)
(Continued)

(52) U.S. Cl.
CPC ....... *H04L 41/0668* (2013.01); *H04B 7/0695* (2013.01); *H04L 5/0048* (2013.01); *H04L 41/0677* (2013.01); *H04L 43/16* (2013.01)

(58) Field of Classification Search
CPC .............. H04L 41/0668; H04L 5/0048; H04L 41/0677; H04L 43/16; H04W 72/046;
(Continued)

(56) References Cited

U.S. PATENT DOCUMENTS

2018/0138962 A1   5/2018   Islam et al.
2018/0270698 A1   9/2018   Babaei et al.
(Continued)

FOREIGN PATENT DOCUMENTS

CN     108093481 A      5/2018
CN     108260214 A      7/2018
(Continued)

OTHER PUBLICATIONS

Supplementary European Search Report for Application No. EP19863865.2, dated May 25, 2022 (10 pages).
(Continued)

*Primary Examiner* — Rownak Islam
(74) *Attorney, Agent, or Firm* — KDW Firm PLLC

(57) ABSTRACT

Provided are a beam recovery method and apparatus, a terminal and a storage medium. The method includes: in a beam recovery process, in response to determining processing of a current stage in the beam recovery process being unsuitable to be implemented on an active bandwidth part (BWP), determining a target BWP of the current stage according to the active BWP and a switch mapping relationship determined for the current stage, switching to the target BWP to perform the processing of the current stage, and continuing to perform the beam recovery process until implementing a beam recovery.

19 Claims, 6 Drawing Sheets

(51) Int. Cl.
　　　*H04L 5/00*　　　(2006.01)
　　　*H04L 41/0677*　(2022.01)
　　　*H04L 43/16*　　(2022.01)

(58) Field of Classification Search
　　　CPC .............. H04W 72/542; H04W 76/19; H04B 7/0695
　　　USPC ........................................................ 370/225
　　　See application file for complete search history.

(56) References Cited

U.S. PATENT DOCUMENTS

| 2019/0215820 | A1* | 7/2019 | Cirik | .............. H04B 17/17 |
| 2019/0222404 | A1* | 7/2019 | Ang | .............. H04L 5/0096 |
| 2021/0067234 | A1* | 3/2021 | Guan | .............. H04W 72/046 |

FOREIGN PATENT DOCUMENTS

| CN | 110798864 A | 2/2020 |
| WO | 2018141238 A1 | 8/2018 |

OTHER PUBLICATIONS

Examination Report for Indian Patent Application No. 202127018444, dated May 31, 2022 (six (6) pages).

International Search Report for the PCT Application No. PCT/CN2019/106749, mailed Dec. 20, 2019, 2 pages.

Interdigital, Inc. "Remaining Issues on Beam Failure Recovery" 3GPP TSG RAN WG1 Meeting #92bis R1-1804846, Apr. 20, 2018.

Mediatek Inc. "Summary of Bandwidth Part Operation" 3GPP TSG RAN WG1 Meeting #90bis R1-1718839, Oct. 13, 2017.

Nokia et al. "On Remaining Aspects of BWPs" 3GPP TSG-RAN WG1 Meeting #90bis R1-1718607, Oct. 13, 2017.

Huawei et al. "User Plane Impacts for Bandwidth Parts" 3GPP TSG-RAN WG2 #99bis—R2-1710217, Oct. 13, 2017.

First Search Report for dated Aug. 18, 2022, for Chinese Patent Application No. 201811110643.6 (six (6) pages).

First Office Action for dated Aug. 25, 2022, for Chinese Patent Application No. 201811110643.6 (six (6) pages).

Nokia, Nokia Shanghai Bell, "Further details on BWP switch interaction with RA", 3GPP TSG-RAN WG2 NR Ad hoc 1801, R2-1800961, Vancouver, Canada, Jan. 22-26, 2018.

Nokia, Nokia Shanghai Bell, "BWP switch interaction with contention free BFR preamble", 3GPP TSG-RAN WG2 Meeting #101, R2-1803229, Revision of R2-1800961, Athens, Greece, Feb. 26-Mar. 2, 2018.

Qualcomm Incorporated, "On repetition enhancements for UL SPS", 3GPP TSG-RAN WG2 Meeting #101bis R2-1804846, Sanya, China, Apr. 16-20, 2018.

Huawei, HiSilicon, "BWP switch for BFR", 3GPP TSG-RAN WG2 Meeting #102 R2-1807444, Resubmission of R2-1804411, Busan, Korea, May 21-25, 2018.

Huawei, HiSilicon, "BWP switch for BFR", 3GPP TSG-RAN WG2 NR AH1807 Meeting, R2-1810091, Revision of R2-1807444, Montreal, Canada, Jul. 2-6, 2018.

\* cited by examiner

BEAM RECOVERY METHOD AND APPARATUS, AND TERMINAL AND STORAGE MEDIUM

CROSS-REFERENCE TO RELATED APPLICATIONS

This is a National Stage Application filed under 35 U.S.C. 371 based on International Patent Application No. PCT/CN2019/106749, filed on Sep. 19, 2019, which claims priority to Chinese Patent Application No. 201811110643.6 filed on Sep. 21, 2018, the disclosures of both of which are incorporated herein by reference in their entireties.

TECHNICAL FIELD

The present disclosure relates to the field of communications and, in particular, to a beam recovery method and apparatus, a terminal and a storage medium.

BACKGROUND

In a radio communication system of the newest 5th generation mobile communication technology (5G), a 5G base station side uses a large-scale antenna array, and performs communications through a directivity beam formed by the beam forming technology. To ensure obtaining sufficient signal gain finally, a base station uses a large number of narrow beams to ensure that users in any direction in a cell can be effectively covered. Moreover, the narrower the beam, the greater the signal gain. However, the transmission using a narrow beam is sensitive to the movement of a user equipment (UE) and the blocking of a beam link. Especially, the blocking is more serious at high frequencies, which often leads to the failure of the beam link. Therefore, when a radio channel changes for the preceding reasons, a terminal in the communication system performs a fast beam link switch and recovery with the base station to provide great user experience.

However, in high-frequency communications, multiple bandwidth parts (BWPs) are usually configured for one user equipment. Among these BWPs, there may be one or more BWPs on which the beam recovery process cannot be implemented, thereby affecting the beam link switch and recovery of the user equipment and thus leading poor user communication experience and other problems.

SUMMARY

Embodiments of the present disclosure provide a beam recovery method and apparatus, a terminal and a storage medium to solve the problem that some BWPs do not support a beam recovery and thus the switch and recovery of a beam link of a user equipment are affected.

An embodiment of the present disclosure provides a beam recovery method. The method includes the steps described below.

In a beam recovery process, if the processing of a current stage in the beam recovery process is unsuitable to be implemented on an active BWP, a target BWP of the current stage is determined according to the active BWP and a switch mapping relationship determined for the current stage. The processing of at least the current stage is suitable to be implemented on the target BWP.

A switch to the target BWP is performed to perform the beam recovery process.

An embodiment of the present disclosure further provides a beam recovery method. The method includes the steps described below.

Backoff parameters of a plurality of BWPs in a BWP set are determined.

In a beam recovery process, a BWP switch is executed according to the backoff parameters of the BWPs to perform a beam recovery.

An embodiment of the present disclosure further provides a beam recovery apparatus. The apparatus includes a target BWP determination unit and a target BWP switch unit.

The target BWP determination unit is configured to, in a beam recovery process, if processing of a current stage in the beam recovery process is unsuitable to be implemented on an active BWP, determine a target BWP of the current stage according to the active BWP and a switch mapping relationship determined for the current stage. The processing of at least the current stage is suitable to be implemented on the target BWP.

The target BWP switch unit is configured to switch to the target BWP to perform the beam recovery process.

An embodiment of the present disclosure further provides a beam recovery apparatus. The apparatus includes a parameter determination unit and a switch execution unit.

The parameter determination unit is configured to determine backoff parameters of a plurality of BWPs in a BWP set.

The switch execution unit is configured to execute a BWP switch in a beam recovery process according to the backoff parameters of the BWPs to perform a beam recovery.

An embodiment of the present application further provides a terminal. The terminal includes a processor, a memory and a communication bus.

The communication bus is configured to implement a connection and communication between the processor and the memory.

The processor is configured to execute a first beam recovery program stored in the memory, to implement the steps of the first beam recovery method described above; or the processor is configured to execute a second beam recovery program stored in the memory, to implement the steps of the second beam recovery method described above.

An embodiment of the present disclosure further provides a computer storage medium. The storage medium stores at least one of a first beam recovery program or a second beam recovery program. The first beam recovery program is executable by one or more processors to implement the steps of the first beam recovery method described above. The second beam recovery program is executed by one or more processors, to implement the steps of the second beam recovery method described above.

According to the beam recovery method and apparatus, the terminal and the storage medium provided by the embodiments of the present disclosure, in a beam recovery process, if it is determined that the processing of the current stage in the beam recovery process is unsuitable to be implemented on an active BWP, then a target BWP of the current stage is determined according to the active BWP and a switch mapping relationship determined for the current stage, and then, a switch to the target BWP is performed to perform the beam recovery process. Since the processing of at least the current stage is suitable to be implemented on the target BWP, the problem that the processing of the current stage in the beam recovery process cannot be implemented can be solved after the switch from the currently active BWP to the target BWP. Therefore, even in high-frequency communication environment, when it is necessary to implement a beam switch, a beam link can be quickly re-established through the BWP switch in conjunction with a beam recovery, to avoid affecting user requirements due to beam link blocking, thereby providing better communication services to users and improving the user experience.

DETAILED DESCRIPTION

Figure 1:
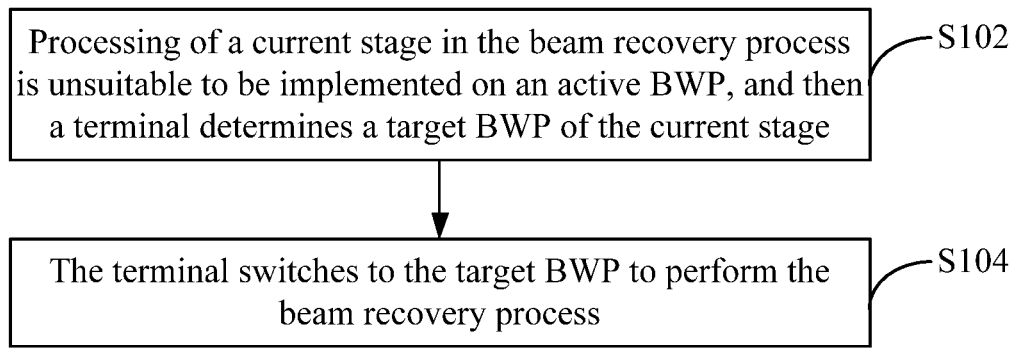
FIG. 1 is a flowchart of a beam recovery method according to embodiment one of the present disclosure.

To make the object, scheme and advantages of the present disclosure more apparent, embodiments of the present disclosure are further described below in detail in conjunction with implementations and drawings. The implementations described herein are merely intended to explain the present disclosure and are not intended to limit the present disclosure.

Embodiment One

For ease of the understanding of those of ordinary skill in the art, before the scheme of this embodiment is described, the beam recovery technology is briefly described here. A beam recovery process mainly includes the stages described below.

(1) A beam failure monitoring stage: This stage is mainly for performing a detection of a source beam and performing a beam failure determination. Generally, a terminal may perform a detection on a reference signal corresponding to the source beam, to implement the beam failure determination according to a detection result. An object to be monitored, that is, the reference signal, may be a reference signal (RS) of quasi-co-location (QCL) of a control channel demodulation pilot, such as a channel state information-reference signal (CSI-RS) or a synchronization signal (SS). The reference signal may be indicated in a transmission configuration indication (TCI).

(2) A target beam selection stage: This stage is mainly for selecting a new beam (hereinafter referred to as "a target beam") for re-establishing a transmission link. After a failure of the source beam is determined by the detection and determination at the beam failure monitoring stage, the terminal attempts to select, by detecting the reference signal, the target beam that meets a condition according to a configured reference signal set. When the terminal selects the target beam according to the detection result of the reference signal, reference signal receiving power (RSRP) is usually used as a basis for the beam selection.

(3) A target beam report stage: In this stage, the terminal reports related information about the beam recovery to a base station, such as terminal indication information and beam indication information. If after the determination at the beam failure monitoring stage, the beam failure is determined and a suitable target beam can be selected at the target beam selection stage, then the terminal needs to report information so that the base station can acquire indication information and beam information about the target beam from the terminal.

(4) A recovery response detection stage: After the terminal reports the related information about the beam recovery to the base station, the base station sends a related response message to the terminal. Thus, the terminal may detect downlink control information (DCI) on a corresponding control channel. Here, the control channel for performing a recovery response detection by the terminal is pre-configured for the terminal. The control channel may be regarded as a "temporary" control channel and is usually sent by using the target beam selected by the terminal.

The general process related to the beam recovery is described above. However, the beam recovery is often applied to high frequency-band communications, and in a scenario of high frequency-band communications, one terminal is usually configured with multiple BWPs, each BWP may adopt a different configuration, and a system may switch to a suitable BWP according to traffic needs. For example, when the terminal has smaller traffic volume or has no traffic, the terminal may switch to a BWP having a smaller bandwidth, thereby reducing the energy consumption; and meanwhile, the introduction of BWP also improves the flexibility of the system. In protocols, for multiple BWPs in a component carrier (CC), if the terminal currently uses one of the multiple BWPs to perform communications, then a control resource set (CORESET) and a data channel, physical downlink shared channel (PDSCH), should all be located in the one BWP, and the terminal performs no detection on another BWP in the CC.

However, when some BWPs whose CORESETs indicate quasi-co-location parameters, reference is made to an RS sent on another BWP. That is, the terminal needs to determine, in conjunction with an RS sent on another BWP, an indication about a quasi-co-location parameter by a BWP CORESET. It is assumed that four BWPs are configured in one CC, these four BWPs have IDs 0, 1, 2 and 3, and each BWP has CORESETs corresponding to two control channels. A quasi-co-location relationship corresponding to the CORESETs is shown in the third column of the table shown below.

TABLE 1

| BWP | Control Channel Configuration | QCL Relationship | Sent RS | Whether Ability to Determine a Beam Failure Exists |
|---|---|---|---|---|
| ID = 0 | CORESET 0-0<br>CORESET 0-1 | RS a<br>RS b | RS a and RS b | Yes: Being Able to Perform a Beam Failure Determination |
| ID = 1 | CORESET 1-0<br>CORESET 1-1 | RS a<br>RS b | RS a | No: Being Able to Determine Only a Beam Failure Corresponding to RS a |
| ID = 2 | CORESET 2-0<br>CORESET 2-1 | RS a<br>RS b | RS b | No: Being Able to Determine Only a Beam Failure Corresponding to RS b |
| ID = 3 | CORESET3-0<br>CORESET 3-1 | RS a<br>RS b | — | No: Being Unable to Perform a Beam Failure Determination |

In Table 1, it may be seen that QCL relationships of CORESETs of each BWP points to RS a and RS b, but both RS a and RS b can be sent on only a BWP having ID 0. On BWPs having IDs 1, 2 and 3, only one of RS a or RS b, or none of RS a and RS b is required to be sent. Therefore, for the BWPs having IDs 1, 2 and 3, when a CORESET indicates a quasi-co-location parameter, it is necessary to make reference to RSs sent on the BWP having ID 0.

According to the definition of the beam failure, the beam failure is determined only when the quality of each monitored beam is lower than a quality threshold. That is, for the four BWPs in Table 1, it is necessary to determine a corresponding beam failure only when determining that the qualities of RS a and RS b are each lower than a quality threshold. Therefore, for the BWPs having IDs 1, 2 and 3, it is necessary to measure the RSs on the BWP having ID 0 to determine whether all beams fail. However, according to the preceding description, when a certain one of the BWPs having IDs 1, 2 and 3 is used, a signal sent on BWP 0 cannot be detected, otherwise the effect of reducing the power consumption of the terminal by using the BWP is lost. Therefore, this causes a problem that the processing of the beam failure monitoring stage cannot be performed on the BWPs having IDs 1, 2 and 3 in the beam recovery process. A similar problem may also exist at the target beam selection stage.

Additionally, some BWPs of the terminal may be configured with no physical random access channel (PRACH) resource for target beam reporting, which causes that the processing of the target beam report stage cannot be implemented on these BWPs in the beam recovery process. Similarly, among the BWP configured for the terminal, there may be one or more BWPs having no control channel for a DCI detection at the recovery response stage. Thus, for these BWPs, the processing of the recovery response state may not be implemented in the beam recovery process.

It may be seen that among the BWPs configured for the terminal, there may be some BWPs on which the processing of one or more stages in the beam recovery stage cannot be implemented. This causes a problem that the terminal cannot implement the beam recovery when using these BWPs to perform communications and thus user communications are interrupted and the user communication experience is affected. To solve the preceding problem, this embodiment provides a beam recovery method. Please refer to a flowchart of a beam recovery method shown in FIG. 1.

In step S102, in a beam recovery process, if the processing of a current stage in the beam recovery process is unsuitable to be implemented on an active BWP, a terminal determines a target BWP of the current stage according to the active BWP and a switch mapping relationship determined for the current stage.

From the preceding description, it may be known that the beam recovery process usually includes a beam failure monitoring stage, a target beam selection stage, a target beam report stage and a recovery response detection stage. Therefore, in the beam recovery process, the terminal usually performs the processing of these four stages in sequence. However, those of ordinary skill in the art may understand that the stages included in the beam recovery process may be increased or decreased with the development of communication technologies. For example, in future communication technologies, a certain one of the preceding four stages may not exist. Therefore, in this embodiment, the beam recovery process may include at least one of the preceding four stages.

A description is given below using an example in which the beam recovery process includes the four stages: the target beam selection stage, the target beam report stage and the recovery response detection stage. When the terminal executes the processing of a certain one of these four stages, it is determined that the processing of this stage is unable to be implemented on the currently active BWP. Then, the terminal may select a target BWP for this stage, so that the terminal may switch to the target BWP to implement the related processing of the current stage in the beam recovery process.

It may be understood that in the beam recovery process, for a stage of the beam recovery, the terminal may determine, after entering the stage, whether the processing of the current stage is suitable to be implemented on the currently used BWP, that is, the currently active BWP. For example, after the terminal enters the beam failure monitoring stage, it is temporarily determined whether the processing of the beam failure monitoring stage is suitable to be implemented on the currently active BWP, for example, BWP 1.

However, in view of the limited number of BWPs configured for the terminal by the base station, so in some examples of this embodiment, the terminal may pre-determine how the ability for supporting each stage in the beam recovery process by each BWP of the terminal, and further determine an unsuitable BWP and an suitable BWP for each stage. Still using the beam failure monitoring stage as an example, the terminal may determine a BWP set on which the beam failure monitoring stage is suitable to be implemented, where the BWP set is here referred to as a first subset s11, and determine a BWP set on which the processing of the beam failure monitoring stage is unsuitable to be performed, where the BWP set is here referred to as a second subset s21. In this way, when the terminal enters the beam failure monitoring stage in the beam recovery process, the terminal may directly determine whether the currently active BWP belongs to s21, and does not need to temporarily determine whether the processing of the beam failure monitoring stage is suitable to be implemented on the currently active BWP.

If the current stage refers to the beam failure monitoring stage or the target beam selection stage, then from the preceding description, it may be known that the processing of the current stage in the beam recovery process is unsuitable to be implemented on the currently active BWP. There may be the two cases described below.

Case 1: The processing of the current stage in the beam recovery process is unable to be independently completed on the currently active BWP. This means that all RSs for the beam failure monitoring or the target beam selection cannot be sent on the currently active BWP. It is assumed that reference signal set q1 {RS a, RS b} needs to be detected in the beam failure monitoring, but only one of reference signal a or reference signal b, or none of reference signal a and reference signal b can be sent on the currently active BWP. In this case, the beam failure monitoring cannot be performed independently according to only a detection result of the reference signal on the currently active BWP. Similarly, it is assumed that at the target beam selection stage, the terminal needs to detect reference signal set q2 {RS c, RS d, RS e, RS f} and all the reference signals in this set cannot be sent on the currently active BWP, and then, the processing of the target beam selection stage is unable to be independently completed on the currently active BWP.

Case 2: The processing of the current stage in the beam recovery process is able to be independently completed on the currently active BWP, but a processing effect does not meet a preset performance requirement. In this case, all reference signals required to be detected at the current stage in the beam recovery process may be sent on the currently active BWP, but detection results of these reference signals detected by the terminal do not meet the preset performance requirement. In this case, it may be considered that the processing of the current stage in the beam recovery process is unsuitable to be implemented on the currently active BWP.

If the current stage is the target beam report stage in the beam recovery process, the processing of the current stage being unsuitable to be implemented on the active BWP refers to that no PRACH resource for the target beam reporting is configured for the BWP.

If the current stage is the recovery response detection stage in the beam recovery process, the processing of the current stage being unsuitable to be implemented on the active BWP refers to that the BWP has no control channel for a DCI detection at the recovery response stage.

In some examples of this embodiment, if the terminal determines that the processing of the current stage in the beam recovery process is unsuitable to be implemented on the currently active BWP, then the terminal may determine the target BWP of the current stage on the basis of the switch mapping relationship pre-configured for the current stage. In these examples, the terminal side is pre-configured with a respective target BWP corresponding to each BWP when each BWP is used as the active BWP in each stage of the beam recovery. This correspondence between an active BWP and a corresponding target BWP is the switch mapping relationship.

It may be understood that switching mapping relationships of the stages in the beam recovery process may be mixed together. For example, switch mapping relationships are set according to BWPs. Using BWP 1 as an example, assuming that the processing of the target beam selection stage and the processing of the recovery response detection stage in the beam recovery process are able to be implemented on BWP 1, a corresponding switch mapping relationship may be that: at the beam failure monitoring stage, a target BWP is BWP 0; at the target beam selection stage, there is no target BWP; at the target beam report stage, the target BWP is BWP 2; and at the recovery response stage, there is no target beam.

However, in some examples, the switch mapping relationships of the stages may be independent of each other. For example, assuming that the processing of the beam failure monitoring stage in the beam recovery process is able to be implemented on both BWP 0 and BWP 3, that is, BWP 0 and BWP 3 belong to a first subset of the beam failure monitoring stage, and correspondingly, BWP 1 and BWP 2 belong to a second subset of the beam failure monitoring stage. Therefore, a switch mapping relationship of the beam failure monitoring stage refers to a mapping relationship between BWPs in the second subset of the beam failure monitoring stage and BWPs in the first subset of the beam failure monitoring stage: BWP 0 corresponds to no target BWP, BWP 1 corresponds to a target BWP which is BWP 0 or BWP 3, and BWP 2 also corresponds to a target BWP which is BWP 0 or BWP 3.

Therefore, the switch mapping relationships of the stages may be independent of each other. That is, each stage corresponds to a different correspondence between BWPs in a first subset and BWPs in a second subset. This means that it is possible that a first subset and a second subset of one stage are different from a first subset and a second subset of another stage respectively, and certainly, it is also possible that two stages have the same first subset and the same second subset, but each of the two stages has a different correspondence between BWPs in the subsets. Therefore, in this embodiment, a respective first subset and/or a respective second subset may be determined for each of at least two stages in the beam recovery process.

Alternatively, a respective correspondence between BWPs in a first subset and BWPs in a second subset may be determined independently for each of at least two stages.

Figure 2:
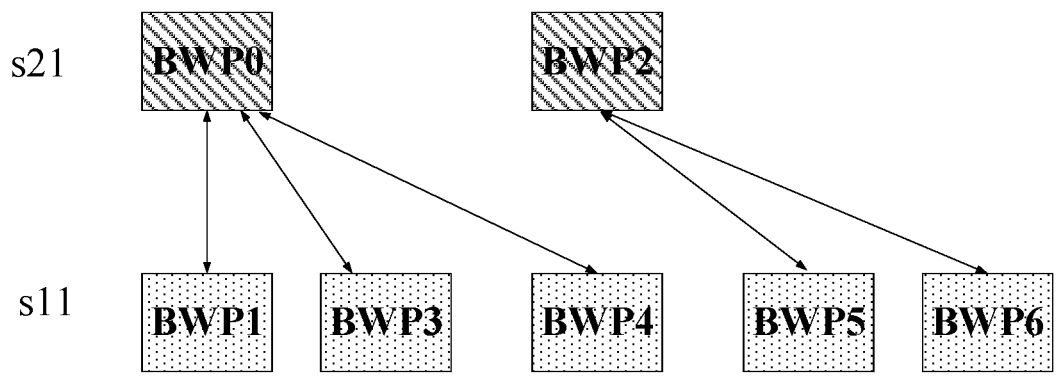
FIG. 2 is a schematic diagram of a switch mapping relationship between BWPs in a second subset and BWPs in a first subset according to embodiment one of the present disclosure.
Figure 3:
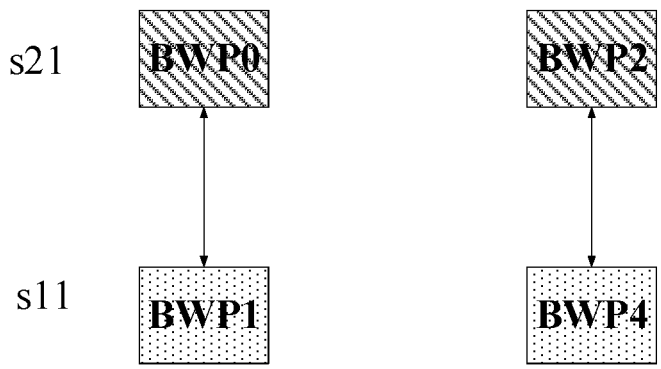
FIG. 3 is a schematic diagram of another switch mapping relationship between BWPs in a second subset and BWPs in a first subset according to embodiment one of the present disclosure.
Figure 4:
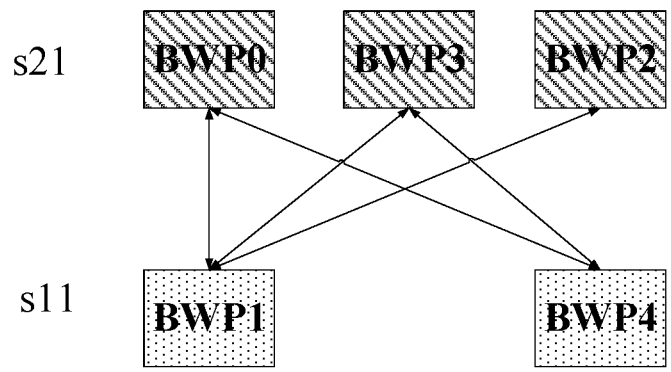
FIG. 4 is a schematic diagram of another switch mapping relationship between BWPs in a second subset and BWPs in a first subset according to embodiment one of the present disclosure.

Certainly, those of ordinary skill in the art may understand that a switch mapping relationship between BWPs in a second subset s21 and BWPs in a first subset s11 at a certain stage in the beam recovery process may be a one-to-multiple correspondence, a one-to-one correspondence or a one-to-multiple correspondence. FIGS. 2 to 4 illustrate the cases where the switch mapping relationship between the BWPs in the second subset and the BWPs in the first subset is a one-to-multiple correspondence, a one-to-one correspondence and a multiple-to-multiple correspondence, respectively. In the case where in a switch mapping relationship corresponding to a certain stage, a BWP in the second subset corresponds to more than one BWPs in the first subset, when the BWP is used as an active BWP, the terminal may select a target BWP for the active BWP in conjunction with some preset conditions or principles, such as selecting a BWP with the smallest ID as the target BWP, or a BWP with the largest ID as the target BWP.

The switch mapping relationship of the current stage may be determined in a pre-agreed mode between the terminal and the base station, may be configured by the base station and notified to the terminal through signaling, or may even be independently determined by the terminal.

There is no doubt that the processing of the current stage in the beam recovery process may be suitable to be implemented on the currently active BWP of the terminal. In this case, the terminal can implement the processing of the current stage even without performing a BWP switch. Therefore, to reduce the processing burden, avoid unnecessary switches by the terminal and shorten the processing time of the beam recovery, the terminal may not need to determine the target BWP anymore in some examples. Certainly, this embodiment does not limit the processing mode in this case. That is, even if the processing of the current stage in the beam recovery process is suitable to be performed on the currently active BWP of the terminal, the terminal may still select and determine the target BWP.

In step S104, the terminal switches to the target BWP to perform the beam recovery process.

After the terminal determines, for the current stage, the target BWP on which the processing of the current stage is suitable to be implemented, the terminal may perform the BWP switch. The terminal continues to perform the processing of the current stage in the beam recovery after switching to the target BWP.

It may be understood that in some cases, when the terminal determines a target BWP corresponding to the currently active BWP and on which the processing of the current stage in the beam recovery process is unsuitable to be implemented, the terminal may directly switch to the target BWP without waiting. However, in some other cases of this embodiment, the terminal may not immediately execute the BWP switch after determining the target BWP. Instead, the terminal may wait for a period of time, or wait for a switch condition to be met and then switch from the active BWP to the target BWP. The switch condition is described below in conjunction with examples.

For example, in some examples of this embodiment, the terminal may monitor a duration in which no downlink control information is detected on the active BWP since the activation of the active BWP, and switch to the target BWP to perform the processing of the current stage when the duration reaches a preset time window duration T. Optionally, when a certain BWP is activated, a timer may be started. The timer has a timing duration of T. If the terminal detects DCI on the active BWP during the timing process of the timer, the terminal may reset the timer until the timing of the timer ends. There is no doubt that if the timing of the timer can end, it means that the terminal has detected no DCI on the BWP for a consecutive duration of T since the activation of the active BWP.

It may be understood that in the preceding example, the terminal uses the timer to monitor whether there is a consecutive duration of T without detecting DCI, but in other examples of this embodiment, a timer may be used instead of the above timer, and an upper limit of the timer is also equal to the preset time window duration. When a certain BWP is activated, the timer is started. Before the timing of the timer is completed, if the terminal detects DCI on the active BWP, the timer is reset to 0, and the timing of the timer is restarted. This is done until the timing of the timer is completed.

In some other examples of this embodiment, the terminal may monitor the number of consecutive time-domain resource units in which no downlink control information is detected on the active BWP since the activation of the active BWP. If the number of time-domain resource units reaches a preset threshold, the terminal switches to the target BWP to perform the processing of the current stage. It may be understood that this manner of determining whether a switch condition is met is equivalent to that the terminal starts a counter. The count value of the counter represents the number of consecutive time-domain resource units in which the terminal receives no DCI on the active BWP. Similarly, if the terminal detects DCI on the active BWP in a certain time-domain resource unit during the counting, then the counter may be reset and restart the counting. In this embodiment, the time-domain resource unit may refer to a slot, a mini-slot, an orthogonal frequency division multiplex (OFDM) symbol, and other currently commonly used units each representing the size of a time-domain resource, or may be other time-domain resource units defined in the future communication field.

In an example of this embodiment, if it is currently at the beam failure monitoring stage in the beam recovery process, and the active BWP is configured with a part (such as RS a in q1) of reference signals required to be detected for the beam failure monitoring (for example, reference signal set q1 is required to be detected at the beam failure monitoring stage), then the terminal may determine, in the modes described below, whether the switch condition is met.

The terminal may detect the part of reference signals which is configured on the active BWP, switch to the target BWP when determining that the quality of this part of reference signals is lower than a quality threshold, and then, continue to perform the processing of the beam failure monitoring stage on the target BWP. For example, in the preceding scenario, the terminal may detect RS a in set q1 on the active BWP. If the terminal determines that the quality of the detected RS a is lower than the quality threshold, then the terminal may determine that the switch condition has been met currently, and thus execute the switch from the active BWP to the target BWP.

After the terminal switches to the target BWP and performs the processing of the current stage in the beam recovery process on the target BWP, if the beam recovery process still does not end, the terminal may continue the beam recovery process. Certainly, it may be understood that after the terminal executes the BWP switch, the original target BWP becomes a new active BWP. Meanwhile, the current stage in the beam recovery process has been switched to another stage. For example, if the current stage in step S102 is the beam failure monitoring stage, and the target BWP is BWP 2, then after the terminal completes the BWP switch, BWP 2 becomes the active BWP. Meanwhile, after the terminal completes the processing of the beam failure monitoring stage on BWP 2, the current stage to be processed is switched from the beam failure monitoring stage to the next stage adjacent to the beam failure monitoring stage, that is, the target beam selection stage. This is similar to the processing of the "current stage" after the switch. For example, if the terminal determines that the processing of the "current stage" after the switch is unsuitable to be implemented on the active BWP after the switch, then the terminal may continue to perform the process in FIG. 1. This is cyclically repeated until the beam recovery is completed.

According to the beam recovery method of this embodiment of the present disclosure, when a terminal executes a beam recovery process, if it is determined that the processing of a current stage in the beam recovery process is unsuitable to be implemented on a currently active BWP, then the terminal may determine, according to a pre-configured switch mapping relationship, a target BWP corresponding to the active BWP and on which the processing of at least the current stage in the beam recovery process is suitable to be implemented. Then, the terminal switches to the target BWP by the BWP switch to implement the current process in the beam recovery on the target BWP. In this way, by combining the beam recovery with the BWP switch, the terminal can still implement the beam recovery on the basis of the BWP switch even in the case where there is a part of BWPs on which the beam recovery process is unable to be independently implemented, thus ensuring that a communication link between the terminal and a base station can be recovered and cannot be interrupted, and improving the communication quality on the terminal side.

Embodiment Two

Figure 5:
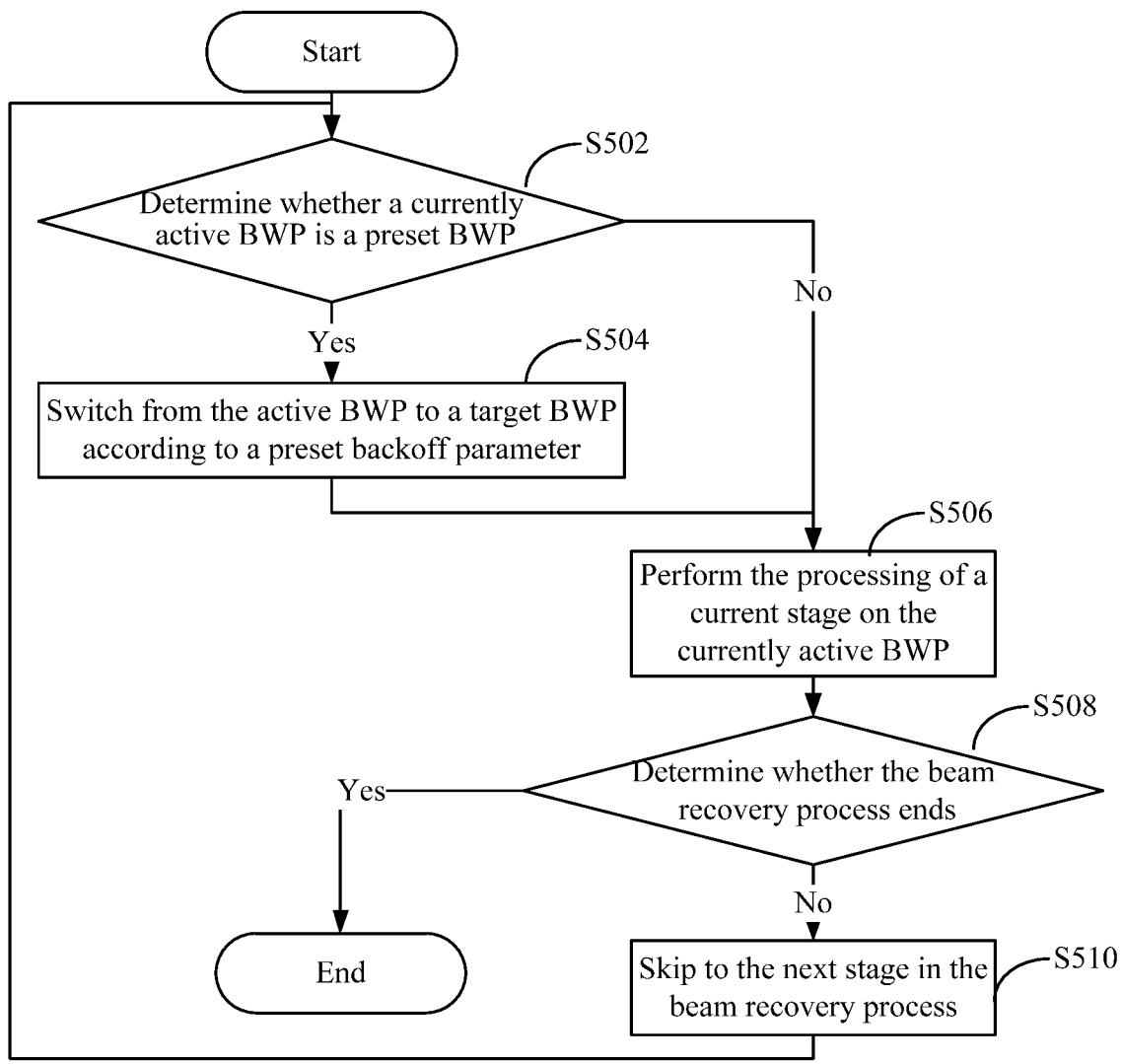
FIG. 5 is a flowchart of a beam recovery method according to embodiment two of the present disclosure.

To make the advantages and details of the preceding beam recovery method more clear to those of ordinary skill in the art, this embodiment continues to describe the beam recovery method on the basis of the preceding embodiment. Please refer to an optional flowchart of a beam recovery method shown in FIG. 5.

In step S502, it is determined whether a currently active BWP is a preset BWP.

If a determination result of a terminal is yes, step S504 is performed. Otherwise, step S506 is performed. The preset BWP essentially refers to a BWP on which the processing of a current stage in a beam recovery process is unsuitable to be implemented. In this embodiment, the terminal may pre-determine the BWP on which the processing of the current stage in the beam recovery process is unsuitable to be implemented. For example, the terminal may pre-determine preset BWPs corresponding to stages in the beam recovery process. In this embodiment, a set of the preset BWPs of the stages is referred to as a "second BWP set", or s2 for short. It may be understood that the preset BWPs may not be exactly the same for four stages of the beam recovery process.

Assuming that it is currently at a beam failure monitoring stage in the beam recovery process, a preset BWP may refer to a BWP on which a reference signal sent is not enough to enable the terminal to implement a beam failure determination; or a BWP on which reference signals sent may enable the terminal to complete the processing of the current stage in the beam recovery process, but detection results of the reference signals by the terminal cannot meet a preset performance requirement. Here, it is assumed that a set constituted of preset BWPs of the beam failure monitoring stage is s21.

Assuming that the terminal is currently at a target beam selection stage in the beam recovery process, a preset BWP may refer to a BWP that set q0 of reference signals sent on the BWP does not contain set q2 of all reference signals required to be detected at the target beam selection stage. In other words, if set q2 corresponding to the currently active BWP cannot constitute a subset of set q0, the active BWP is not the preset BWP. In some other examples of this embodiment, the preset beam of the target beam selection stage may further include a BWP that a reference signal sent on the BWP can independently enable the terminal to select the target beam, but the detection quality of the corresponding reference signal by the terminal does not reach a corresponding quality threshold. Here, it is assumed that a set constituted of preset BWPs of the target beam selection stage is s22.

If the current stage is a target beam report stage in the beam recovery process, a preset BWP may refer to a BWP configured with no PRACH resource for the target beam reporting. Here, it is assumed that a set constituted of preset BWPs of the target beam report stage is s23.

If the current stage is a recovery response detection stage in the beam recovery process, a preset BWP may refer to a BWP having no control channel for a DCI detection at the recovery response stage. Here, it is assumed that a set constituted of preset BWPs of the recovery response detection stage is s24.

Therefore, the second BWP set s2 is {s21, s22, s23, s24}. It may be seen that BWPs in the second BWP set s2 meet at least one of the following conditions that:

the processing of the beam failure monitoring stage is unsuitable to be implemented, for example, a beam failure determination is unable to be independently performed on a certain BWP in s2;

the processing of the target beam selection stage is unsuitable to be implemented, for example, a beam selection after a beam failure is unable to be independently performed on a certain BWP in s2;

the processing of the target beam report stage is unsuitable to be implemented, for example, a certain BWP in s2 is configured with no PRACH resource for the target beam reporting; or the processing of the recovery response stage is unsuitable to be implemented, for example, a certain BWP in s2 is configured with no control channel for a DCI detection at the recovery response stage.

In step S504, the active BWP is switched to the target BWP according to a preset backoff parameter.

After it is determined that the currently active BWP is a preset BWP corresponding to the current stage in the beam recovery process, the terminal may perform a BWP switch according to the preset backoff parameter. The backoff parameter of the active BWP usually includes information that can represent the target BWP of the active BWP. The information may be used for determining which BWP is the target BWP corresponding to the active BWP. In this embodiment, preset BWPs in the second BWP set may correspond to the same target BWP or different target BWPs. Here, a set constituted of the target BWPs corresponding to the preset BWPs is referred to as a "first BWP set", or s1 for short. Therefore, in a backoff parameter of a certain preset BWP in the second BWP set s2, information used for indicating a target BWP corresponding to the preset BWP may be a correspondence between the preset BWP and the BWPs in the first BWP set s1, that is, a switch mapping relationship.

Additionally, the backoff parameter of the active BWP may also include a switch condition for switching from the active BWP to the corresponding target BWP. For example, the switch condition includes any one of a timing duration of a timer, a timing duration of a timer, or a counting upper limit of a counter.

In this embodiment, the backoff parameter may include at least one of the switch mapping relationship or the switch condition. When the backoff parameter includes only the switch mapping relationship, the preset BWPs in the second BWP set may be directly switched to the corresponding target BWPs, that is, there is no additional switch condition. When the backoff parameter includes only the switch condition, the target BWPs to which the preset BWPs in the second BWP set are switched may be uniformly pre-configured by default. Certainly, in more examples, the backoff parameter may include both the switch mapping relationship and the switch condition.

Figure 6:
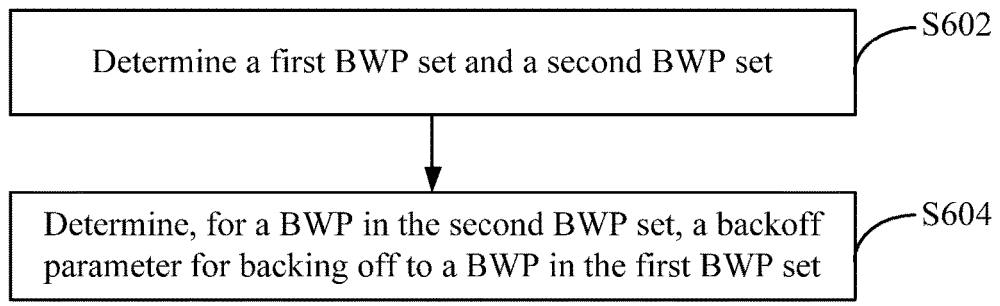
FIG. 6 is a flowchart of a beam recovery configuration according to embodiment two of the present disclosure.

In some examples of this embodiment, before the terminal performs the beam recovery process, possible switch scenarios in the beam recovery process may be pre-determined to perform a beam recovery configuration, thereby preparing for the beam recovery process. The beam recovery configuration process provided in this embodiment is briefly described in conjunction with a flowchart in FIG. 6.

In step S602, a first BWP set and a second BWP set are determined.

It may be understood that BWPs in the first BWP set s1 meets at least one of the following conditions that:

the processing of a beam failure monitoring stage is suitable to be implemented, for example, a beam failure determination is able to be independently performed on a certain BWP in s1;

the processing of a target beam selection stage is suitable to be implemented, for example, a beam selection after a beam failure is able to be independently performed on a certain BWP in s1;

the processing of a target beam report stage is suitable to be implemented, for example, a certain BWP in s1 is configured with a PRACH resource for the target beam reporting; or the processing of a recovery response stage is suitable to be implemented, for example, a certain BWP in s1 is configured with a control channel for a DCI detection at the recovery response stage.

The condition that BWPs in the second BWP set S2 need to meet has been described above and is not repeated here. It may be understood that there may be no intersection between the first BWP set s1 and the second BWP set s2, or there may be an intersection between the first BWP set s1 and the second BWP set s2. Additionally, this embodiment does not limit a time sequence for determining the first BWP set and the second BWP set. The terminal may first determine any one of the first BWP set or the second BWP set, or may simultaneously determine the two BWP sets.

In step S604, a backoff parameter for backing off to a BWP in the first BWP set is determined for a BWP in the second BWP set.

In some cases, backoff parameters of preset BWPs in the second BWP set may be uniformly configured. In this case, the preset BWPs may have the same backoff parameter, that is, the same switch mapping relationship and the same switch condition. For example, in some examples, the first BWP set includes an initial BWP or a default BWP, and the target BWP corresponding to each preset BWP may be the initial BWP or the default BWP since the initial BWP and the default BWP usually have better performance than other BWPs.

In some other cases, the backoff parameters of the preset BWPs in the second BWP set may be configured separately. Meanwhile, backoff parameters of preset BWPs at stages in a beam recovery process may be independent of each other. It is assumed that the first BWP set s1 includes {s11, s12, s13, s14}. Each BWP included in s11 is a BWP on which the processing of the beam failure monitoring stage in the beam recovery process is suitable to be performed. Each BWP included in s12 is a BWP on which the processing of the target beam selection stage in the beam recovery process is suitable to be performed. Each BWP included in s13 is a BWP on which the processing of the target beam report stage in the beam recovery process is suitable to be performed. Each BWP included in s14 is a BWP on which the processing of the recovery response detection stage in the beam recovery process is suitable to be performed. Then, the terminal determining a switch mapping relationship of the BWPs in the second BWP set s2 is actually that the terminal determines a mapping relationship between BWPs in s21 and BWPs in s11, a mapping relationship between BWPs in s22 and BWPs in s12, a mapping relationship between BWPs in s23 and BWPs in s13, and a mapping relationship between BWPs in s24 and BWPs in s14.

It may be understood, during the determination of the backoff parameter, priority may be given to enabling a preset BWP in the second BWP set to back off to a BWP on which the processing of more stages in the beam recovery process is able to be continuously implemented. For example, it is assumed that the processing of the target beam selection stage is unable to be independently implemented on BWP 2, while a target beam selection process is able to be implemented on each of BWP 1, BWP 3 and BWP 4, but the processing of the target beam report stage after the target beam selection stage is unsuitable to be implemented on BWP 1 and the processing of the recovery response detection stage is unsuitable to be implemented on BWP 3, and the processing of the target beam selection stage and subsequent stages after the target beam selection stage are able to be implemented on BWP 4. In this case, the terminal may preferentially create a switch mapping relationship between BWP 2 in the second BWP set and BWP 4 in the first BWP set. In this way, after the terminal switches from BWP 2 to BWP 4 in the beam recovery process, the terminal may directly complete the processing of the remaining stages in the beam recovery on BWP 4 without more BWP switches, thus saving the processing time of the beam recovery, improving the efficiency of the beam recovery and improving the user experience.

A process in which the terminal switches the active BWP to the target BWP according to the preset backoff parameter in the beam recovery method according to this embodiment is described below in conjunction with FIGS. 7 to 10.

Figure 7:
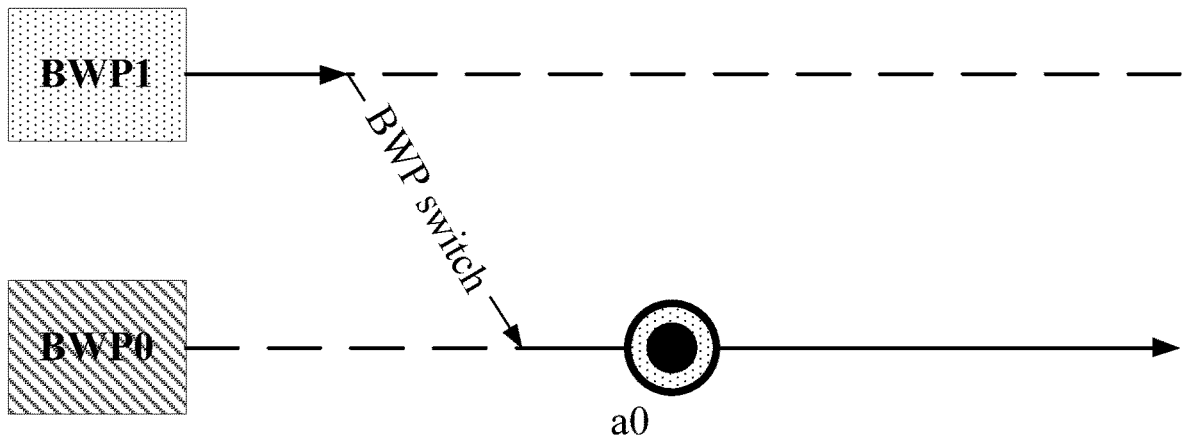
FIG. 7 is a schematic diagram illustrating that a terminal performs a BWP switch at a beam failure monitoring stage according to embodiment two of the present disclosure.

Referring to FIG. 7, a currently active BWP in FIG. 7 is BWP 1. It is assumed that the beam failure monitoring is unable to be independently completed on BWP 1. For example, no RS for the beam failure monitoring is sent on BWP 1, or only a part of RSs included in RS set q1 for the beam failure monitoring is sent on BWP 1. In this case, a terminal may perform a BWP switch according to a backoff parameter of BWP 1.

First, the terminal needs to determine a backoff object of BWP 1. In FIG. 7, a target BWP to which BWP 1 needs to be switched is BWP 0.

Additionally, the terminal needs to determine whether a switch condition is met. The BWP switch is executed only when the switch condition is met. In an example of this embodiment, the switch condition may include the conditions described below.

Condition 1: The terminal has received no DCI on BWP 1 for a time period of T. It may be understood that the value of T here may be determined by the size of a time window, or by a counter, and T includes m slots.

It is to be noted that in the case where a part of RSs contained in beam failure monitoring set q1 are sent on BWP 1, that is, only a part of RSs in RS set q1 for the beam failure monitoring are sent on BWP 1, if the terminal determines that detection results of RSs that are sent on BWP 1 and in RS set q1 are each lower than a quality threshold, it may be determined that the switch condition is met. That is, in these examples, the switch condition does not include condition 1, but includes condition 2: the part of reference signals in RS set q1 for the beam failure monitoring are sent on BWP 1, and the detection results of this part of reference signals by the terminal are each lower than the quality threshold.

Certainly, in some other examples of this embodiment, the switch condition also includes both condition 1 and condition 2 described above.

There is no doubt that when the terminal executes a BWP switch, in addition to that any one of the preceding switch conditions is met, it is implicitly required that the beam failure monitoring cannot be independently performed on BWP 1.

In FIG. 7, after the terminal determines that a backoff condition in the backoff parameter of BWP 1 is met, the terminal may execute the BWP switch from BWP 1 to BWP 0, and execute a beam failure monitoring process (shown as a0 in FIG. 7) on BWP 0.

Figure 8:
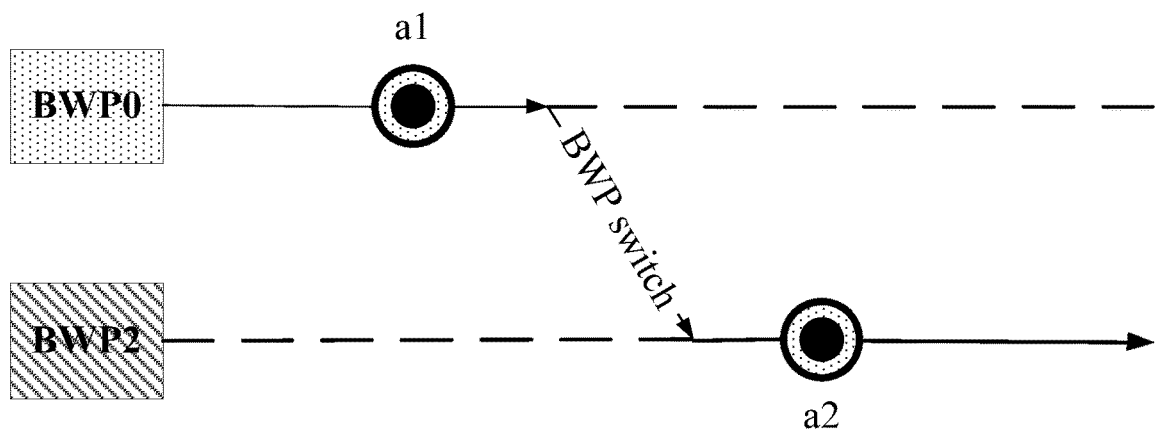
FIG. 8 is a schematic diagram illustrating that a terminal performs a BWP switch at a target beam selection stage according to embodiment two of the present disclosure.

For a target beam selection stage, please refer to FIG. 8. In FIG. 8, a currently active BWP is BWP 0. It is assumed that the terminal has implemented the beam failure monitoring process (illustrated as a1 in FIG. 8) on BWP 0, but the processing of the target beam selection stage cannot be independently completed on BWP 0. For example, no RS for a target beam selection can be sent on BWP 0, or only a part of RSs contained in RS set q2 for a target beam selection are sent on BWP 0, or no target beam meeting a condition can be selected on BWP 0. Then, in these cases, the terminal may perform a BWP switch according to a backoff parameter of BWP 0. In FIG. 8, a target BWP of BWP 0 at the target beam selection stage is BWP 2, so the terminal may switch to BWP 2 to execute the processing of the target beam selection process (illustrated as a2 in FIG. 8).

Figure 9:
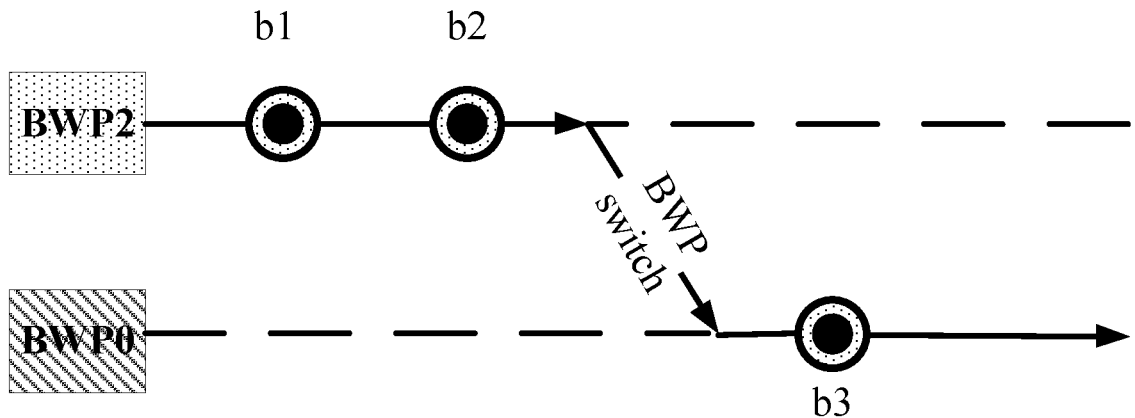
FIG. 9 is a schematic diagram illustrating that a terminal performs a BWP switch at a target beam report stage according to embodiment two of the present disclosure.

FIG. 9 is a schematic diagram of a BWP switch at a target beam report stage. In FIG. 9, a currently active BWP is BWP 2. It is assumed that the terminal has implemented the beam failure monitoring process (illustrated as b1 in FIG. 9) and the target beam selection process (illustrated as b2 in FIG. 9) on BWP 2, but the processing of the target beam report stage cannot be completed on BWP 2. For example, in the case of time division duplexing (TDD), no PRACH resource for the target beam reporting is configured on BWP 2; then, when the terminal proceeds to the target beam report process in the beam recovery process, the terminal may switch to a target BWP of BWP 2, that is, BWP 0, according to a backoff parameter of BWP 2 after the terminal detects and determines that a switch condition is met, and the terminal executes the target beam report process (illustrated as b3 in FIG. 9) on BWP 0.

Figure 10:
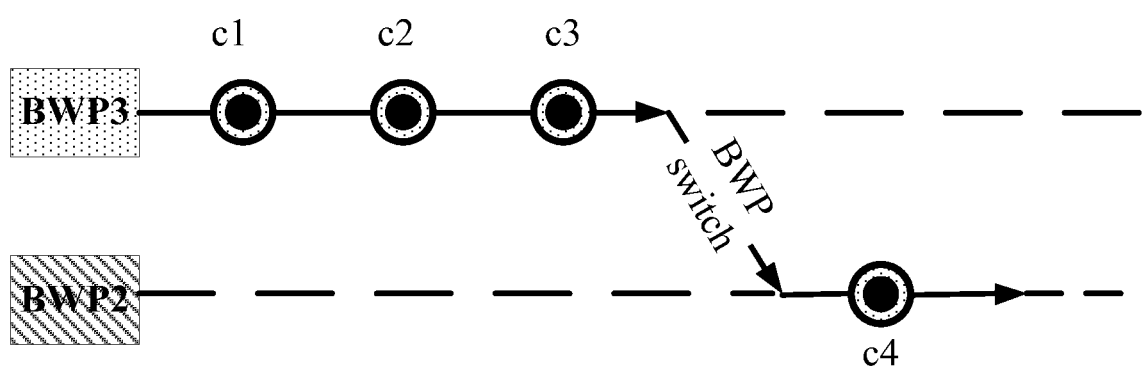
FIG. 10 is a schematic diagram illustrating that a terminal performs a BWP switch at a recovery response detection stage according to embodiment two of the present disclosure.

FIG. 10 is a schematic diagram of a BWP switch at a recovery response detection stage in the beam recovery process. In FIG. 10, a currently active BWP is BWP 3. It is assumed that the terminal has implemented the beam failure monitoring process (illustrated as c1 in FIG. 10), the target beam selection process (illustrated as c2 in FIG. 10) and the target beam report process (illustrated as c3 in FIG. 10) on BWP 3, but the processing of the recovery response stage is unsuitable to be implemented on BWP 3. Since there is no control channel resource for a beam recovery response detection on BWP 3, it is necessary to switch to a BWP having a control channel resource for a beam recovery response detection, for example, BWP 2, and the recovery response detection process (illustrated as c4 in FIG. 10) is next performed on BWP 2.

FIGS. 7 to 10 each illustrate the case where the terminal performs only one BWP switch. However, it is to be noted that the several BWP switches shown in FIGS. 7 to 10 may be combined with each other. That is, more than one BWP switches may occur in the beam recovery process.

In step S506, the processing of the current stage is performed on the currently active BWP.

If the processing of the current stage in the beam recovery process is suitable to be implemented on an originally active BWP of the terminal, then the terminal may not need to perform a BWP switch. That is, the active BWP keeps unchanged, and the terminal directly performs the processing of the current stage in the beam recovery process on the active BWP.

If the processing of the current stage in the beam recovery process is unsuitable to be implemented on the originally active BWP of the terminal, then an active BWP after the BWP switch by the terminal in step S504 has become a BWP on which the processing of the current stage is suitable to be implemented. In this case, the terminal may perform the processing of the current stage on the currently active BWP.

In step S508, it is determined whether the beam recovery process ends.

The processing of steps S502 to S506 is suitable for each stage in the beam recovery process, so after the terminal implements the processing of the current stage in the beam recovery process, the terminal may determine whether the beam recovery process has ended. If a determination result is yes, the process ends. Otherwise, the flow proceeds to step S510. Then, the preceding processing is cyclically repeated continuously.

In step S510, the flow skips to the next stage in the beam recovery process.

After the terminal skips to the next stage in the beam recovery process, step S502 is still performed.

According to the beam recovery method provided in this embodiment, before formally entering a beam recovery process, a terminal may first perform a beam recovery configuration, a first BWP set and a second BWP set are pre-determined, and backoff parameters for backing off and switching to corresponding BWPs in the first BWP set by BWPs in the second BWP set are configured. In this way, when the terminal executes a beam backoff process, the terminal can directly execute backoff according to a backoff parameter in the pre-configuration. In this way, on the basis of BWP switch, stages of a beam recovery can be implemented, a beam link can be re-established, and user communications can be guaranteed. Meanwhile, since temporarily determining a BWP switch strategy is avoided, the time required for the beam recovery process can be saved.

Embodiment Three

Figure 11:
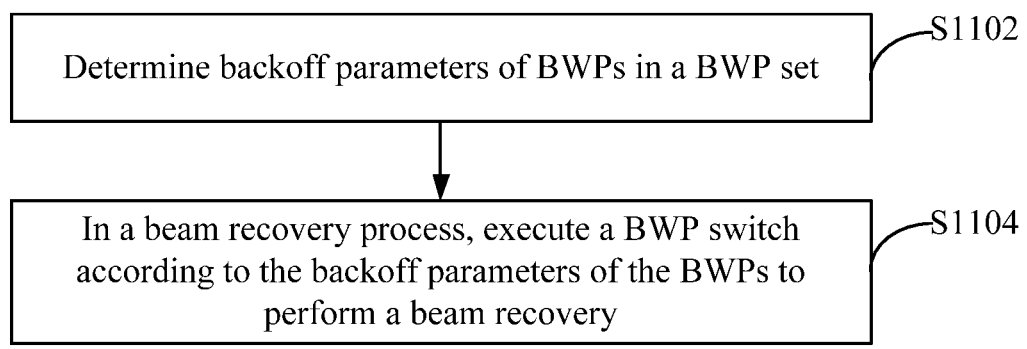
FIG. 11 is a flowchart of a beam recovery method according to embodiment three of the present disclosure.

This embodiment provides a beam recovery method. Please refer to a flowchart of a beam recovery method shown in FIG. 11.

In step S1102, backoff parameters of BWPs in a BWP set are determined.

In this embodiment, a backoff parameter includes at least one piece of information for representing a switch mapping relationship, or information for representing a switch condition. In some examples, the backoff parameter includes both the switch mapping relationship and the switch condition.

In some examples of this embodiment, when a terminal determines the backoff parameters of the BWPs in the BWP set, the backoff parameters may be uniformly configured using the BWP set as a unit. That is, the BWPs in the BWP set have the same backoff parameter. However, in some other examples of this embodiment, when the terminal determines the backoff parameters, determined backoff parameters of the BWPs in the BWP set may be not exactly the same. That is, backoff parameters of at least two BWPs are configured separately. For example, in an example of this embodiment, the terminal configures backoff parameters of two types of BWPs in the BWP set separately. BWPs in one type of BWPs meet at least one of the following conditions that:

1. the processing of a beam failure monitoring stage is unsuitable to be implemented, for example, a beam failure determination cannot be independently performed on a certain BWP in this type of BWPs;

2. the processing of a target beam selection stage is unsuitable to be implemented, for example, a beam selection after a beam failure cannot be independently performed on a certain BWP in this type of BWPs;
3. the processing of a target beam report stage is unsuitable to be implemented, for example, a certain BWP in this type of BWPs is configured with no PRACH resource for the target beam reporting; or
4. the processing of a recovery response stage is unsuitable to be implemented, for example, a certain BWP in this type of BWPs is configured with no control channel for a DCI detection at the recovery response stage.

BWPs in another type of BWPs meet at least one of the following conditions that:
1. the processing of a beam failure monitoring stage is suitable to be implemented, for example, a beam failure determination can be independently performed on a certain BWP in this type of BWPs;
2. the processing of a target beam selection stage is suitable to be implemented, for example, a beam selection after a beam failure can be independently performed on a certain BWP in this type of BWPs;
3. the processing of a target beam report stage is suitable to be implemented, for example, a certain BWP in this type of BWPs is configured with a PRACH resource for the target beam reporting; or
4. the processing of a recovery response stage is suitable to be implemented, for example, a certain BWP in this type of BWPs is configured with a control channel for a DCI detection at the recovery response stage.

It may be understood that the preceding two types of BWPs may have some same BWPs. Additionally, in this embodiment, when the terminal configures the backoff parameters, the terminal may configure the backoff parameters according to different stages in the beam recovery process separately, or configure the backoff parameters of the stages uniformly.

In step S1104, in a beam recovery process, a BWP switch is executed according to the backoff parameters of the BWPs to perform a beam recovery.

In some examples, the backoff parameters of the BWPs in the BWP set are uniformly configured, and BWPs contained in the BWP set are not BWPs on which only the processing of a certain stage in the beam recovery process is unsuitable to be implemented. For example, in some examples, the BWP set includes one or more BWPs on which the processing of the beam failure monitoring stage in the beam recovery process is unsuitable to be implemented, one or more BWPs on which the processing of the target beam selection stage in the beam recovery process is unsuitable to be implemented, one or more BWPs on which the processing of the target beam report stage in the beam recovery process is unsuitable to be implemented, and one or more BWPs on which the processing of a recovery response monitoring stage in the beam recovery process is unsuitable to be implemented.

Therefore, for a stage of the beam recovery, in the BWP set, there are some BWPs whose backoff parameters do not need to take effect, since at a certain stage of the beam recovery, there are one or more BWPs on which the processing of the current stage in the beam recovery is suitable to be implemented. Therefore, the terminal needs to determine, for each BWP in the BWP set, whether a backoff parameter needs to take effect.

In this embodiment, a BWP whose backoff parameter needs to take effect is referred to as an "effective BWP". It may be seen that the effective BWP meets at least one of the following conditions that:
a beam failure determination cannot be independently performed on the effective BWP;
a beam selection after a beam failure cannot be independently performed on the effective BWP;
the reporting of information about a selected beam in the beam recovery process cannot be performed on the effective BWP; or
a control information detection for a beam recovery response cannot be performed on the effective BWP.

After the terminal determines the effective BWP, when the beam recovery process is performed, if the currently active BWP is the effective BWP, the terminal may make the backoff parameter take effect, and switch from the effective BWP to a target BWP according to the corresponding backoff parameter, to perform the beam recovery.

According to the beam recovery method in this embodiment, when it is necessary to implement a beam switch, a beam link can be quickly re-established through a BWP switch in conjunction with a beam recovery, to avoid affecting user requirements due to beam link blocking, thereby providing better communication services to users and improving the user experience.

Embodiment Four

Figure 12:
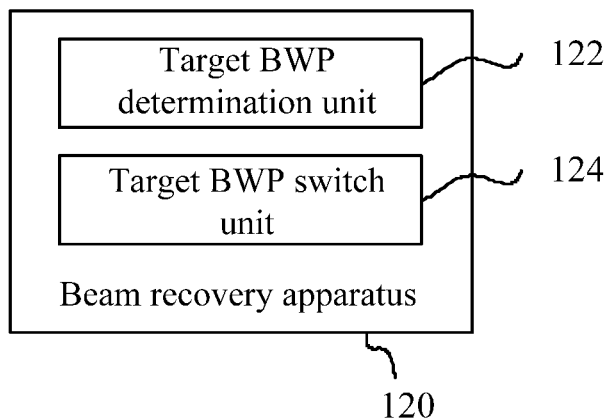
FIG. 12 is structural diagram of a beam recovery apparatus according to embodiment four of the present disclosure.

This embodiment provides a beam recovery apparatus. Please refer to a structural diagram of a beam recovery apparatus provided in FIG. 12.

The beam recovery apparatus 120 includes a target BWP determination unit 122 and a target BWP switch unit 124. The target BWP determination unit 122 is configured to, in a beam recovery process, if the processing of a current stage in the beam recovery is unsuitable to be implemented on an active BWP, determine a target BWP of the current stage according to the active BWP and a switch mapping relationship determined for the current stage. The target BWP switch unit 124 is configured to switch to the target BWP to perform the beam recovery process.

From the preceding description, it may be known that the beam recovery process usually includes a beam failure monitoring stage, a target beam selection stage, a target beam report stage and a recovery response detection stage. Therefore, in the beam recovery process, the beam recovery apparatus 120 usually performs the processing of these four stages in sequence. However, those of ordinary skill in the art may understand that the stages included in the beam recovery process may be increased or decreased with the development of communication technologies. For example, in future communication technologies, a certain one of the preceding four stages may not exist. Therefore, in this embodiment, the beam recovery process may include at least one of the preceding four stages.

A description is given below using an example in which the beam recovery includes the four stages: the target beam selection stage, the target beam report stage and the recovery response detection stage. When the beam recovery apparatus 120 executes the processing of a certain one of the four stages, it is determined that the processing of this stage is unable to be implemented on the currently active BWP. Then, the target BWP determination unit 122 may re-select a target BWP for this stage, so that the BWP switch unit 124 may switch to the target BWP to implement the related processing of the current stage in the beam recovery process.

It may be understood that in the beam recovery process, for a stage of the beam recovery, the target BWP determination unit 122 may determine, after entering the stage, whether the processing of the current stage is suitable to be implemented on the currently used BWP, that is, the currently active BWP. For example, after the target BWP determination unit 122 enters the beam failure monitoring stage, it is temporarily determined whether the processing of the beam failure monitoring stage is suitable to be implemented on the currently active BWP, for example, BWP 1.

However, in view of the limited number of BWPs configured for the beam recovery apparatus 120 by the base station, so in some examples of this embodiment, the target BWP determination unit 122 may pre-determine how the ability for supporting each stage in the beam recovery process by each BWP of the target BWP determination unit 122, and further determine an unsuitable BWP and an suitable BWP for each stage. Still using the beam failure monitoring stage as an example, the target BWP determination unit 122 may determine a BWP set on which the beam failure monitoring stage is suitable to be implemented, where the BWP set is referred to as a first subset s11 here, and also determine a BWP set on which the processing of the beam failure monitoring stage is unsuitable to be performed, where the BWP set is referred to as a second subset s21 here. In this way, when the beam recovery apparatus 120 enters the beam failure monitoring stage in the beam recovery process, the target BWP determination unit 122 may directly determine whether the currently active BWP belongs to s21, and does not need to temporarily determine whether the processing of the beam failure monitoring stage is suitable to be implemented on the currently active BWP.

If the current stage refers to the beam failure monitoring stage or the target beam selection stage, then from the preceding description, it may be known that the processing of the current stage in the beam recovery process is unsuitable to be implemented on the currently active BWP. There may be the two cases described below.

Case 1: The processing of the current stage in the beam recovery process is unable to be independently completed on the currently active BWP. This means that all RSs for the beam failure monitoring or the target beam selection cannot be sent on the currently active BWP. It is assumed that reference signal set q1 {RS a, RS b} needs to be detected in the beam failure monitoring, but only one of reference signal a or reference signal b, or none of reference signal a and reference signal b can be sent on the currently active BWP. Then, in this case, the beam failure monitoring cannot be performed independently according to only a detection result of the reference signal on the currently active BWP. Similarly, it is assumed that at the target beam selection stage, the beam recovery apparatus 120 needs to detect reference signal set q2 {RS c, RS d, RS e, RS f} and all the reference signals in this set cannot be sent on the currently active BWP, and then, the processing of the target beam selection stage is unable to be independently completed on the currently active BWP.

Case 2: The processing of the current stage in the beam recovery process is able to be independently completed on the currently active BWP, but a processing effect does not meet a preset performance requirement. In this case, all reference signals required to be detected at the current stage in the beam recovery process may be sent on the currently active BWP, but detection results of these reference signals detected by the beam recovery apparatus 120 do not meet the preset performance requirement. In this case, it may be considered that the processing of the current stage in the beam recovery process is unsuitable to be implemented on the currently active BWP.

If the current stage is the target beam report stage in the beam recovery process, the processing of the current stage being unsuitable to be implemented on the active BWP refers to that no PRACH resource for the target beam reporting is configured for the BWP.

If the current stage is the recovery response detection stage in the beam recovery process, the processing of the current stage being unsuitable to be implemented on the active BWP refers to that the BWP has no control channel for a DCI detection at the recovery response stage.

In some examples of this embodiment, if it is determined that the processing of the current stage in the beam recovery process is unsuitable to be implemented on the currently active BWP, then the target BWP determination unit 122 may determine the target BWP of the current stage on the basis of the switch mapping relationship pre-configured for the current stage. In these examples, the beam recovery apparatus 120 side is pre-configured with a respective target BWP corresponding to each BWP when each BWP is used as the active BWP in each stage of the beam recovery. This correspondence between an active BWP and a corresponding target BWP is the switch mapping relationship.

It may be understood that switching mapping relationships of the stages in the beam recovery process may be mixed together. For example, switch mapping relationships are set according to BWPs. Using BWP 1 as an example, assuming that the processing of the target beam selection stage and the processing of the recovery response detection stage in the beam recovery process are able to be implemented on BWP 1, a corresponding switch mapping relationship may be that: at the beam failure monitoring stage, a target BWP is BWP 0; at the target beam selection stage, there is no target BWP; at the target beam report stage, the target BWP is BWP 2; and at the recovery response stage, there is no target beam.

However, in some examples, the switch mapping relationships of the stages may be independent of each other. For example, assuming that the processing of the beam failure monitoring stage in the beam recovery process is able to be implemented on both BWP 0 and BWP 3, that is, BWP 0 and BWP 3 belong to a first subset of the beam failure monitoring stage, and correspondingly, BWP 1 and BWP 2 belong to a second subset of the beam failure monitoring stage. Therefore, a switch mapping relationship of the beam failure monitoring stage refers to a mapping relationship between BWPs in the second subset of the beam failure monitoring stage and BWPs in the first subset of the beam failure monitoring stage: BWP 0 corresponds to no target BWP, BWP 1 corresponds to a target BWP which is BWP 0 or BWP 3, and BWP 2 also corresponds to a target BWP which is BWP 0 or BWP 3.

Therefore, the switch mapping relationships of the stages may be independent of each other. That is, each stage corresponds to a different correspondence between BWPs in a first subset and BWPs in a second subset. This means that it is possible that a first subset and a second subset of one stage are different from a first subset and a second subset of another stage respectively, and certainly, it is also possible that two stages have the same first subset and the same second subset, but each of the two stages has a different correspondence between BWPs in the subsets. Therefore, in this embodiment, the beam recovery apparatus 120 may determine a respective first subset and/or a respective second subset for each of at least two stages in the beam recovery process. Alternatively, the beam recovery apparatus 120 may independently determine a respective correspondence between BWPs in a first subset and BWPs in a second subset for each of at least two stages.

Certainly, those of ordinary skill in the art may understand that a switch mapping relationship between BWPs in a second subset and BWPs in a first subset of a certain stage in the beam recovery process may be a one-to-multiple correspondence, a one-to-one correspondence or a one-to-multiple correspondence. FIGS. 2 to 4 illustrate the cases where the switch mapping relationship between the BWPs in the second subset and the BWPs in the first subset is a one-to-multiple correspondence, a one-to-one correspondence and a multiple-to-multiple correspondence, respectively. In the case where in a switch mapping relationship corresponding to a certain stage, a BWP in a second subset corresponds to more than one BWPs in a first subset, when the BWP is used as an active BWP, the target BWP determination unit 122 may select a target BWP for the active BWP in conjunction with some preset conditions or principles, such as selecting a BWP with the smallest ID as the target BWP, or a BWP with the largest ID as the target BWP.

The switch mapping relationship pre-configured for the current stage by the beam recovery apparatus 120 side may be determined in a pre-agreed mode between the beam recovery apparatus 120 and the base station, may be configured by the base station and notified to the beam recovery apparatus 120 through signaling, or may even be independently determined by the terminal.

There is no doubt that the processing of the current stage in the beam recovery process may be suitable to be implemented on the currently active BWP of the beam recovery apparatus 120. In this case, the beam recovery apparatus 120 can implement the processing of the current stage even without performing a BWP switch. Therefore, to reduce the processing burden, avoid unnecessary switches by the beam recovery apparatus 120 and shorten the processing time of the beam recovery, the target BWP determination unit 122 may not need to determine the target BWP anymore in some examples. Certainly, this embodiment does not limit the processing mode in this case. That is, even if the processing of the current stage in the beam recovery process is suitable to be performed on the currently active BWP of the beam recovery apparatus 120, the target BWP determination unit 122 may still select and determine the target BWP.

After the target BWP determination unit 122 determines, for the current stage, the target BWP on which the processing of the current stage is suitable to be implemented, the target BWP switch unit 124 may perform the BWP switch. The target BWP switch unit 124 continues to perform the processing of the current stage in the beam recovery after switching to the target BWP.

It may be understood that in some cases, when the target BWP determination unit 122 determines a target BWP corresponding to the active BWP and on which the processing of the current stage in the beam recovery process is suitable to be implemented, the target BWP determination unit 122 may directly switch to the target BWP without waiting. However, in some other cases of this embodiment, after the target BWP determination unit 122 determines the target BWP, the target BWP switch unit 124 may not immediately execute the BWP switch. Instead, the target BWP switch unit 124 may wait for a period of time, or wait for a switch condition to be met and then switch from the active BWP to the target BWP. The switch condition is described below in conjunction with examples.

For example, in some examples of this embodiment, the target BWP switch unit 124 may monitor a duration in which no downlink control information is detected on the active BWP since the activation of the active BWP, and switch to the target BWP to perform the processing of the current stage when the duration reaches a preset time window duration T. Optionally, when a certain BWP is activated, a timer may be started. The timer has a timing duration of T. If the beam recovery apparatus 120 detects DCI on the active BWP during the timing process, the target BWP switch unit 124 may reset the timer until the timing of the timer ends. There is no doubt that if the timing of the timer can end, it means that the beam recovery apparatus 120 has detected no DCI on the BWP for a consecutive duration of T since the activation of the active BWP.

It may be understood that in the preceding example, the target BWP switch unit 124 uses the timer to monitor whether there is a consecutive duration of T without detecting DCI, but in other examples of this embodiment, a timer may be used instead of the above timer, and an upper limit of the timer is also equal to the preset time window duration. When a certain BWP is activated, the timer is started. Before the timing of the timer is completed, if the beam recovery apparatus 120 detects DCI on the active BWP, the timer is reset to 0, and the timing of the timer is restarted. This is done until the timing of the timer is completed.

In some other examples of this embodiment, the target BWP switch unit 124 may monitor the number of consecutive time-domain resource units in which no downlink control information is detected on the active BWP since the activation of the active BWP. If the number of time-domain resource units reaches a preset threshold, the target BWP switch unit 124 switches to the target BWP to perform the processing of the current stage. It may be understood that this manner of determining whether a switch condition is met is equivalent to that the target BWP switch unit 124 starts a counter. The count value of the counter represents the number of consecutive time-domain resource units in which the beam recovery apparatus 120 receives no DCI on the active BWP. Similarly, during the counting, if the beam recovery apparatus 120 detects DCI on the active BWP in a certain time-domain resource unit, then the counter may be reset and restart the counting. In this embodiment, the time-domain resource unit may refer to a slot, a mini-slot, an OFDM symbol, and other currently commonly used units each representing the size of a time-domain resource, or may be other time-domain resource units defined in the future communication field.

In an example of this embodiment, if it is currently at the beam failure monitoring stage in the beam recovery process, and the currently active BWP is configured with a part (such as RS a in q1) of reference signals required to be detected for the beam failure monitoring (for example, reference signal set q1 is required to be detected at the beam failure monitoring stage), then the target BWP switch unit 124 may determine, in the modes described below, whether the switch condition is met.

The target BWP switch unit 124 may detect the part of reference signals which is configured on the active BWP, switch to the target BWP when determining that the quality of this part of reference signals is lower than a quality threshold, and then, continue to perform the processing of the beam failure monitoring stage on the target BWP. For example, in the preceding scenario, the target BWP switch unit 124 may detect RS a in set q1 on the currently active BWP. If the target BWP switch unit 124 determines that the quality of the detected RS a is lower than the quality threshold, then the target BWP switch unit 124 may determine that the switch condition has been met currently, and thus execute the switch from the active BWP to the target BWP.

After the target BWP switch unit 124 switches to the target BWP and performs the processing of the current stage in the beam recovery process on the target BWP, if the beam recovery process still does not end, a continue recovery unit 126 may continue the beam recovery process. Certainly, it may be understood that after the target BWP switch unit 124 completes the BWP switch, the original target BWP becomes a currently active BWP. Meanwhile, the current stage in the beam recovery process has been switched to another stage. For example, if the "current stage" is the beam failure monitoring stage, and the target BWP is BWP 2, then after the target BWP switch unit 124 completes the BWP switch, BWP 2 becomes the currently active BWP. Meanwhile, after the target BWP switch unit 124 completes the processing of the beam failure monitoring stage on BWP 2, the current stage to be processed is switched from the beam failure monitoring stage to the next stage adjacent to the beam failure monitoring stage, that is, the target beam selection stage. This is similar to the processing of the "current stage" after the switch. For example, if the beam recovery apparatus 120 determines that the processing of the "current stage" after the switch is unsuitable to be implemented on the active BWP after the switch, that is, the original target BWP, then the beam recovery apparatus 120 may continue repeating the preceding process cyclically until the beam recovery is completed.

It may be understood that in this embodiment, the beam recovery apparatus 120 may be deployed on a terminal. The functions of the target BWP determination unit 122 and the target BWP switch unit 124 may be implemented by a processor of the terminal.

According to the beam recovery apparatus in this embodiment of the present disclosure, when a beam recovery process is executed, if it is determined that the processing of a current stage in the beam recovery process is unsuitable to be implemented on a currently active BWP, the beam recovery apparatus may determine, according to a pre-configured switch mapping relationship, a target BWP corresponding to the currently active BWP and on which the processing of at least the current stage in the beam recovery process is suitable to be implemented. Then, the beam recovery apparatus switches to the target BWP by the BWP switch to implement the current process in the beam recovery on the target BWP. In this way, by combining the beam recovery with the BWP switch, the beam recovery apparatus can still implement the beam recovery on the basis of the BWP switch even in the case where there is a part of BWPs on which the beam recovery process is unable to be independently implemented, thus ensuring that a communication link between the beam recovery apparatus and a base station can be recovered and cannot be interrupted, and improving the communication quality on the terminal side.

Embodiment Five

To make the advantages and details of the preceding beam recovery apparatus more clear to those of ordinary skill in the art, this embodiment continues to describe the beam recovery apparatus on the basis of the preceding embodiment.

Figure 13:
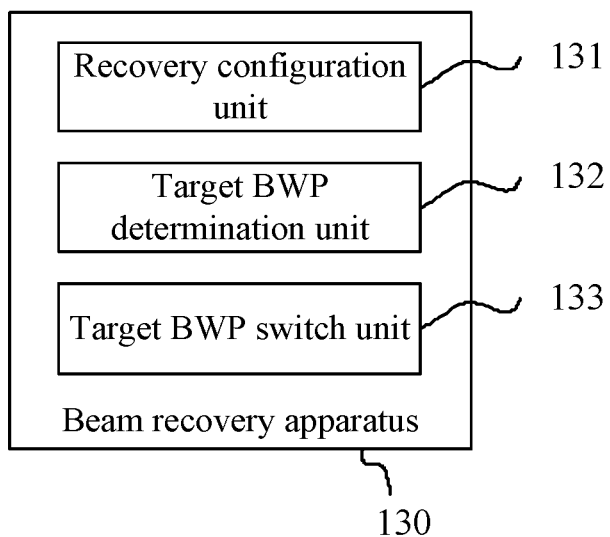
FIG. 13 is structural diagram of a beam recovery apparatus according to embodiment five of the present disclosure.

Referring to a structural diagram of a beam recovery apparatus 130 shown in FIG. 13, the beam recovery apparatus 130 includes a recovery configuration unit 131, a target BWP determination unit 132 and a target BWP switch unit 133.

The target BWP determination unit 132 determines whether a currently active BWP is a preset BWP. If a determination result of the target BWP determination unit 132 is no, it is not necessary to perform a BWP switch. Otherwise, it is necessary to perform a BWP switch.

The preset BWP essentially refers to a BWP on which the processing of a current stage in a beam recovery process is unsuitable to be implemented. In this embodiment, the recovery configuration unit 131 may pre-determine the BWP on which the processing of the current stage in the beam recovery process is unsuitable to be implemented. For example, the recovery configuration unit 131 may pre-determine preset BWPs corresponding to stages in the beam recovery process. In this embodiment, a set of the preset BWPs of the stages is referred to as a "second BWP set", or s2 for short. It may be understood that the preset BWPs may not be exactly the same for four stages of the beam recovery process.

Assuming that it is currently at a beam failure monitoring stage in the beam recovery process, a preset BWP may refer to a BWP on which a reference signal sent is not enough to enable the beam recovery apparatus 130 to implement a beam failure determination; or a BWP on which reference signals sent may enable the beam recovery apparatus 130 to complete the processing of the current stage in the beam recovery process, but detection results of the reference signals by the terminal cannot meet a preset performance requirement. Here, it is assumed that a set constituted of preset BWPs of the beam failure monitoring stage is s21.

Assuming that the beam recovery apparatus 130 is currently at a target beam selection stage in the beam recovery process, a preset BWP may refer to a BWP that set q0 of reference signals sent on the BWP does not contain set q2 of all reference signals required to be detected at the target beam selection stage. In other words, if set q2 corresponding to the currently active BWP cannot constitute a subset of set q0, the active BWP is not the preset BWP. Here, it is assumed that a set constituted of preset BWPs of the target beam selection stage is s22.

If the current stage is a target beam report stage in the beam recovery process, a preset BWP may refer to a BWP configured with no PRACH resource for the target beam reporting. Here, it is assumed that a set constituted of preset BWPs of the target beam report stage is s23.

If the current stage is a recovery response detection stage in the beam recovery process, a preset BWP may refer to a BWP having no control channel for a DCI detection at the recovery response stage. Here, it is assumed that a set constituted of preset BWPs of the recovery response detection stage is s24.

Therefore, the second BWP set s2 is {s21, s22, s23, s24}. It may be seen that BWPs in the second BWP set s2 meet at least one of the following conditions that:

the processing of the beam failure monitoring stage is unsuitable to be implemented, for example, a beam failure determination is unable to be independently performed on a certain BWP in s2;

the processing of the target beam selection stage is unsuitable to be implemented, for example, a beam selection after a beam failure is unable to be independently performed on a certain BWP in s2;

the processing of the target beam report stage is unsuitable to be implemented, for example, a certain BWP in s2 is configured with no PRACH resource for the target beam reporting; or the processing of the recovery response stage is unsuitable to be implemented, for example, a certain BWP in s2 is configured with no control channel for a DCI detection at the recovery response stage.

After the target BWP determination unit 132 determines that the currently active BWP is a preset BWP corresponding to the current stage in the beam recovery process, the target BWP switch unit 133 may perform a BWP switch according to a preset backoff parameter. The backoff parameter of the active BWP usually includes information that can represent the target BWP of the active BWP. The information may be used for determining which BWP is the target BWP corresponding to the active BWP. In this embodiment, the preset BWPs in the second BWP set may correspond to the same target BWP or different target BWPs. Here, a set constituted of the target BWPs corresponding to the preset BWPs is referred to as a "first BWP set", or s1 for short. Therefore, in a backoff parameter of a certain preset BWP in the second BWP set s2, information used for indicating a target BWP corresponding to the preset BWP may be a correspondence between the preset BWP and the BWPs in the first BWP set s1, that is, a switch mapping relationship.

Additionally, the backoff parameter of the active BWP may also include a switch condition for switching from the active BWP to the corresponding target BWP. For example, the switch condition includes any one of a timing duration of a timer, a timing duration of a timer, or a counting upper limit of a counter.

In this embodiment, the backoff parameter may include at least one of the switch mapping relationship or the switch condition. When the backoff parameter includes only the switch mapping relationship, the preset BWPs in the second BWP set may be directly switched to the corresponding target BWPs, that is, there is no additional switch condition. When the backoff parameter includes only the switch condition, the target BWPs to which the preset BWPs in the second BWP set are switched may be uniformly pre-configured by default. Certainly, in more examples, the backoff parameter may include both the switch mapping relationship and the switch condition.

In some examples of this embodiment, before the beam recovery apparatus 130 performs the beam recovery process, the recovery configuration unit 131 may pre-determine possible switch scenarios in the beam recovery process to perform a beam recovery configuration, thereby preparing for the beam recovery process.

The recovery configuration unit 131 may first determine a first BWP set and a second BWP set, and then, determine a backoff parameter for backing off to a BWP in the first BWP set by a BWP in the second BWP set.

It may be understood that BWPs in the first BWP set s1 meet at least one of the following conditions that:

the processing of a beam failure monitoring stage is suitable to be implemented, for example, a beam failure determination is able to be independently performed on a certain BWP in s1;

the processing of a target beam selection stage is suitable to be implemented, for example, a beam selection after a beam failure is able to be independently performed on a certain BWP in s1;

the processing of a target beam report stage is suitable to be implemented, for example, a certain BWP in s1 is configured with a PRACH resource for the target beam reporting; or the processing of a recovery response stage is suitable to be implemented, for example, a certain BWP in s1 is configured with a control channel for a DCI detection at the recovery response stage.

The condition that BWPs in the second BWP set S2 need to meet has been described above and is not repeated here. It may be understood that there may be no intersection between the first BWP set s1 and the second BWP set s2, or there may be an intersection between the first BWP set s1 and the second BWP set s2. Additionally, this embodiment does not limit a time sequence for determining the first BWP set and the second BWP set. The recovery configuration unit 131 may first determine any one of the first BWP set or the second BWP set, or may simultaneously determine the two BWP sets.

In some cases, the backoff parameters of preset BWPs in the second BWP set may be uniformly configured. In this case, the preset BWPs may have the same backoff parameter, that is, the same switch mapping relationship and the same switch condition. For example, in some examples, the first BWP set includes an initial BWP or a default BWP, and the target BWP corresponding to each preset BWP may be the initial BWP or the default BWP since the initial BWP and the default BWP usually have better performance than other BWPs.

In some other cases, the backoff parameters of the preset BWPs in the second BWP set may be configured separately. Meanwhile, backoff parameters of preset BWPs at stages in the beam recovery process may be independent of each other. It is assumed that the first BWP set s1 includes {s11, s12, s13, s14}. Each BWP included in s11 is a BWP on which the processing of the beam failure monitoring stage in the beam recovery process is suitable to be performed. Each BWP included in s12 is a BWP on which the processing of the target beam selection stage in the beam recovery process is suitable to be performed. Each BWP included in s13 is a BWP on which the processing of the target beam report stage in the beam recovery process is suitable to be performed. Each BWP included in s14 is a BWP on which the processing of the recovery response detection stage in the beam recovery process is suitable to be performed. Then, the recovery configuration unit 131 determining a switch mapping relationship of the BWPs in the second BWP set s2 is actually that the recovery configuration unit 131 determines a mapping relationship between BWPs in s21 and BWPs in s11, a mapping relationship between BWPs in s22 and BWPs in s12, a mapping relationship between BWPs in s23 and BWPs in s13, and a mapping relationship between BWPs in s24 and BWPs in s14.

It may be understood, when the recovery configuration unit 131 determines the backoff parameters, priority may be given to enabling a preset BWP in the second BWP set to back off to a BWP on which the processing of more stages in the beam recovery process is able to be continuously implemented. For example, it is assumed that the processing of the target beam selection stage is unable to be independently implemented on BWP 2, while a target beam selection process is able to be implemented on each of BWP 1, BWP 3 and BWP 4, but the processing of the target beam report stage after the target beam selection stage is unsuitable to be implemented on BWP 1 and the processing of the recovery response detection stage is unsuitable to be implemented on BWP 3, and the processing of the target beam selection stage and subsequent stages after the target beam selection stage are able to be implemented on BWP 4. In this case, the recovery configuration unit 131 may preferentially create a switch mapping relationship between BWP 2 in the second BWP set and BWP 4 in the first BWP set. In this way, after the target BWP switch unit 133 of the beam recovery apparatus 130 switches from BWP 2 to BWP 4 in the beam recovery process, the target BWP switch unit 133 may directly complete the processing of the remaining stages in the beam recovery on BWP 4 without more BWP switches, thus saving the processing time of the beam recovery, improving the efficiency of the beam recovery and improving the user experience.

A process in which the target BWP switch unit 133 switches the active BWP to the target BWP according to the preset backoff parameter in the beam recovery method according to this embodiment is described below in conjunction with FIGS. 7 to 10.

Referring to FIG. 7, a currently active BWP in FIG. 7 is BWP 1. It is assumed that the beam failure monitoring is unable to be independently completed on BWP 1. For example, no RS for the beam failure monitoring is sent on BWP 1, or only a part of RSs included in RS set q1 for the beam failure monitoring is sent on BWP 1. In this case, the target BWP switch unit 133 may perform a BWP switch according to a backoff parameter of BWP 1.

First, the target BWP switch unit 133 needs to determine a backoff object of BWP 1. In FIG. 7, a target BWP to which BWP 1 needs to be switched is BWP 0, and a beam failure monitoring process (illustrated as a0 in FIG. 7) is executed on BWP 0.

Additionally, the target BWP switch unit 133 needs to determine whether a switch condition is met. The BWP switch is executed only when the switch condition is met. In an example of this embodiment, the switch condition may include the conditions described below.

Condition 1: The beam recovery apparatus 130 has received no DCI on BWP 1 for a time period of T. It may be understood that the value T here may be determined according to the size of a time window, or by a counter, and T includes m slots.

It is to be noted that in the case where a part of RSs contained in beam failure monitoring set q1 are sent on BWP 1, that is, only a part of RSs in RS set q1 for the beam failure monitoring are sent on BWP 1, if the target BWP switch unit 133 determines that detection results of RSs that are sent on BWP 1 and in RS set q1 are each lower than a quality threshold, it may be determined that the switch condition is met. That is, in these examples, the switch condition does not include condition 1, but includes condition 2: the part of reference signals in RS set q1 for the beam failure monitoring are sent on BWP 1, and the detection results of this part of reference signals by the beam recovery apparatus 130 are each lower than the quality threshold.

Certainly, in some other examples of this embodiment, the switch condition also includes both condition 1 and condition 2 described above.

There is no doubt that when the target BWP switch unit 133 executes a BWP switch, in addition to that any one of the preceding switch conditions is met, it is implicitly required that the beam failure monitoring cannot be independently performed on BWP 1.

In FIG. 7, after the target BWP switch unit 133 determines that a backoff condition in the backoff parameter of BWP 1 is met, the target BWP switch unit 133 may execute the BWP switch from BWP 1 to BWP 0.

For a target beam selection stage, please refer to FIG. 8. In FIG. 8, a currently active BWP is BWP 0. It is assumed that the beam recovery apparatus 130 has implemented the beam failure monitoring process (illustrated as a1 in FIG. 8) on BWP 0, but the processing of the target beam selection stage cannot be independently completed on BWP 0. For example, no RS for a target beam selection can be sent on BWP 0, or only a part of RSs contained in RS set q2 for a target beam selection are sent on BWP 0, or no target beam meeting a condition can be selected on BWP 0. Then, in these cases, the target BWP switch unit 133 may perform a BWP switch according to a backoff parameter of BWP 0. In FIG. 8, a target BWP of BWP 0 at the target beam selection stage is BWP 2, so a terminal may switch to BWP 2 to execute the processing of the target beam selection process (illustrated as a2 in FIG. 8).

FIG. 9 is a schematic diagram of a BWP switch at a target beam report stage. In FIG. 9, a currently active BWP is BWP 2. It is assumed that the beam recovery apparatus 130 has implemented the beam failure monitoring process (illustrated as b1 in FIG. 9) and the target beam selection process (illustrated as b2 in FIG. 9) on BWP 2, but the processing of the target beam report stage cannot be completed on BWP 2. For example, in the case of TDD, no PRACH resource for the target beam reporting is configured on BWP 2; then, when the beam recovery apparatus 130 proceeds to the target beam report process in the beam recovery process, the beam recovery apparatus 130 may switch to a target BWP of BWP 2, that is, BWP 0, according to a backoff parameter of BWP 2 after the beam recovery apparatus 130 detects and determines that a switch condition is met, and the beam recovery apparatus 130 execute the target beam report process (illustrated as b3 in FIG. 9) on BWP 0.

FIG. 10 is a schematic diagram of a BWP switch at a recovery response detection stage in the beam recovery process. In FIG. 10, a currently active BWP is BWP 3. It is assumed that the beam recovery apparatus 130 has implemented the beam failure monitoring process (illustrated as c1 in FIG. 10), the target beam selection process (illustrated as c2 in FIG. 10) and the target beam report process (illustrated as c3 in FIG. 10) on BWP 3, but the processing of the recovery response stage is unsuitable to be implemented on BWP 3. Since there is no control channel resource for a beam recovery response detection on BWP 3, it is necessary to switch to a BWP having a control channel resource for a beam recovery response detection, for example, BWP 2, and the recovery response detection process (illustrated as c4 in FIG. 10) is next performed on BWP 2.

FIGS. 7 to 10 each illustrate that the beam recovery apparatus 130 performs only one BWP switch. However, it is to be noted that the several BWP switches shown in FIGS. 7 to 10 may be combined with each other. That is, more than one BWP switches may occur in the beam recovery process.

If the processing of the current stage in the beam recovery process is suitable to be implemented on an originally active BWP of the beam recovery apparatus 130, then the beam recovery apparatus 130 may not need to perform a BWP switch. That is, the active BWP keeps unchanged, and the beam recovery apparatus 130 directly performs the processing of the current stage in the beam recovery process on the active BWP.

If the processing of the current stage in the beam recovery process is unsuitable to be implemented on the originally active BWP of the beam recovery apparatus 130, then an active BWP after the BWP switch by the target BWP switch unit 133 has become a BWP on which the processing of the current stage is suitable to be implemented. In this case, the beam recovery apparatus 130 may perform the processing of the current stage on the currently active BWP.

After the beam recovery apparatus 130 implements the processing of the current stage in the beam recovery process, the beam recovery apparatus 130 may determine whether the beam recovery process has end. If a determination result is yes, the process ends. Otherwise, the flow skips to the next stage in the beam recovery process. Then, the processing is cyclically repeated continuously until the beam recovery process ends.

It may be understood that in this embodiment, the beam recovery apparatus 130 may be deployed on a terminal. The functions of the recovery configuration unit 131, the target BWP determination unit 132 and the target BWP switch unit 133 may be implemented by a processor of the terminal.

According to the beam recovery apparatus provided in this embodiment, before formally entering a beam recovery process, the beam recovery apparatus may first perform a beam recovery configuration, a first BWP set and a second BWP set are pre-determined, and backoff parameters for backing off to corresponding BWPs in the first BWP set by BWPs in the second BWP set are configured. In this way, when the beam recovery apparatus executes a beam backoff process, the beam recovery apparatus can directly execute backoff according to the backoff parameters in the pre-configuration. In this way, on the basis of BWP switch, stages of a beam recovery can be implemented, a beam link can be re-established, and user communications can be guaranteed. Meanwhile, since temporarily determining a BWP switch strategy is avoided, this the time required for the beam recovery process can be saved.

Embodiment Six

Figure 14:
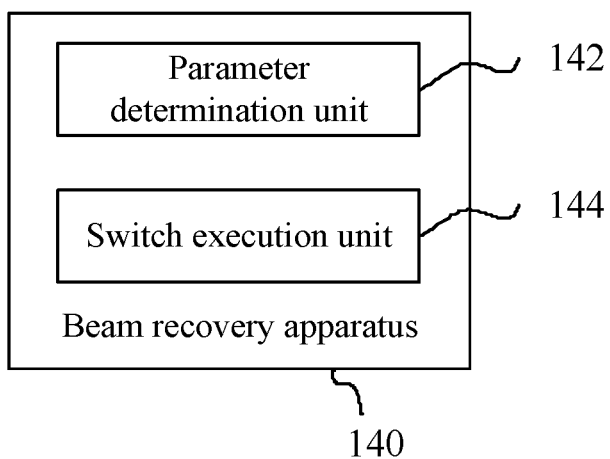
FIG. 14 is structural diagram of a beam recovery apparatus according to embodiment six of the present disclosure.

This embodiment provides a beam recovery apparatus. Please refer to a structural diagram of a beam recovery apparatus shown in FIG. 14.

The beam recovery apparatus 140 includes a parameter determination unit 142 and a switch execution unit 144.

The parameter determination unit 142 is configured to determine backoff parameters of BWPs in a BWP set. In this embodiment, a backoff parameter includes at least one piece of information for representing a switch mapping relationship, or information for representing a switch condition. In some examples, the backoff parameter includes both the switch mapping relationship and the switch condition.

In some examples of this embodiment, when the parameter determination unit 142 determines the backoff parameters of the BWPs in the BWP set, the backoff parameters may be uniformly configured using the BWP set as a unit. That is, the BWPs in the BWP set have the same backoff parameter. However, in some other examples of this embodiment, when the parameter determination unit 142 determines the backoff parameters, determined backoff parameters of the BWPs in the BWP set may be not exactly the same. That is, backoff parameters of at least two BWPs are configured separately. For example, in an example of this embodiment, the parameter determination unit 142 configures backoff parameters of two types of BWPs in the BWP set separately. BWPs in one type of BWPs meet at least one of the following conditions that:

1. the processing of a beam failure monitoring stage is unsuitable to be implemented, for example, a beam failure determination cannot be independently performed on a certain BWP in this type of BWPs;
2. the processing of a target beam selection stage is unsuitable to be implemented, for example, a beam selection after a beam failure cannot be independently performed on a certain BWP in this type of BWPs;
3. the processing of a target beam report stage is unsuitable to be implemented, for example, a certain BWP in this type of BWPs is configured with no PRACH resource for the target beam reporting; or
4. the processing of a recovery response stage is unsuitable to be implemented, for example, a certain BWP in this type of BWPs is configured with no control channel for a DCI detection at the recovery response stage.

The backoff parameter includes a switch condition for switching to a target BWP in a first BWP set and a switch mapping relationship corresponding to BWPs in a second BWP set.

In this embodiment, BWP in the first BWP set s1 meet at least one of the following conditions that:

1. the processing of a beam failure monitoring stage is suitable to be implemented, for example, a beam failure determination can be independently performed on a certain BWP in this type of BWPs;
2. the processing of a target beam selection stage is suitable to be implemented, for example, a beam selection after a beam failure can be independently performed on a certain BWP in this type of BWPs;
3. the processing of a target beam report stage is suitable to be implemented, for example, a certain BWP in this type of BWPs is configured with a PRACH resource for the target beam reporting; or
4. the processing of a recovery response stage is suitable to be implemented, for example, a certain BWP in this type of BWPs is configured with a control channel for a DCI detection at the recovery response stage.

It may be understood that the preceding two types of BWPs may have some same BWPs. Additionally, in this embodiment, when the parameter determination unit 142 configures the backoff parameters, the parameter determination unit 142 may configure the backoff parameters according to different stages in the beam recovery process separately, or configure the backoff parameters of the stages uniformly.

The switch execution unit 144 is configured to execute a BWP switch in a beam recovery process according to the backoff parameters of the BWPs to perform a beam recovery. In some examples, the parameter determination unit 142 uniformly configures the backoff parameters of the BWPs in the BWP set, and BWPs contained in the BWP set are not BWPs on which only the processing of a certain stage in the beam recovery process is unsuitable to be implemented. For example, in some examples, the BWP set includes one or more BWPs on which the processing of the beam failure monitoring stage in the beam recovery process is unsuitable to be implemented, one or more BWPs on which the processing of the target beam selection stage in the beam recovery process is unsuitable to be implemented, one or more BWPs on which the processing of the target beam report stage in the beam recovery process is unsuitable to be implemented, and one or more BWPs on which the processing of a recovery response monitoring stage in the beam recovery process is unsuitable to be implemented.

Therefore, for a stage of the beam recovery, in the BWP set, there are some BWPs whose backoff parameters do not need to take effect, since at a certain stage of the beam recovery, there are one or more BWPs on which the processing of the current stage in the beam recovery is suitable to be implemented. Therefore, the switch execution unit 144 needs to determine, in the second BWP set, an effective BWP whose backoff parameter needs to take effect.

In this embodiment, the BWP whose backoff parameter needs to take effect is referred to as an "effective BWP". It may be seen that the effective BWP meets at least one of the following conditions that:

a beam failure determination cannot be independently performed on the effective BWP;

a beam selection after a beam failure cannot be independently performed on the effective BWP;

the reporting of information about a selected beam in the beam recovery process cannot be performed on the effective BWP; or a control information detection for a beam recovery response cannot be performed on the effective BWP.

After the effective BWP is determined, when the beam recovery process is performed, if the currently active BWP is the effective BWP, the switch execution unit 144 may make the backoff parameter take effect, and switch from the effective BWP to a target BWP according to the corresponding backoff parameter.

After the switch execution unit 144 switches to the target BWP, the processing of the beam recovery process is continued until the beam recovery is implemented. It may be understood that the beam recovery apparatus 140 may need to execute multiple BWP switches to complete the beam recovery.

It may be understood that in this embodiment, the beam recovery apparatus 140 may be deployed on a terminal. The functions of the parameter determination unit 142 and the switch execution unit 144 may be implemented by a processor of the terminal.

According to the beam recovery apparatus in this embodiment, when it is necessary to implement a beam switch, a beam link can be quickly re-established through a BWP switch in conjunction with a beam recovery, to avoid affecting user requirements due to beam link blocking, thereby providing better communication services to users and improving the user experience.

Embodiment Seven

This embodiment first provides a storage medium. The storage medium may store one or more computer programs that can be read, compiled and executed by one or more processors. In this embodiment, the storage medium may store at least one of a first beam recovery program or a second beam recovery program. The first beam recovery program is executable by one or more processors to implement any beam recovery method in embodiments one and two described above. The second beam recovery program is executable by one or more processors to implement any beam recovery method in embodiment three described above.

Figure 15:
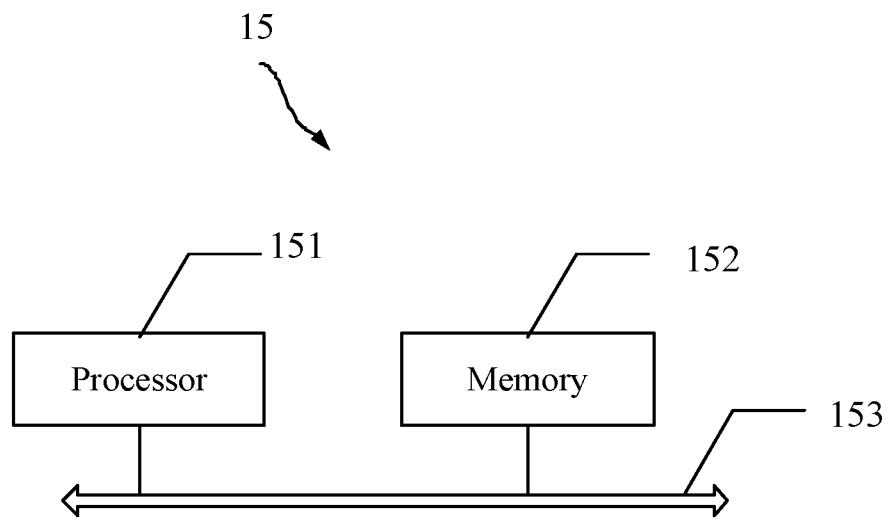
FIG. 15 is a structural diagram of hardware of a terminal according to embodiment seven of the present disclosure.

This embodiment further provides a terminal. As shown in FIG. 15, a terminal 15 includes a processor 151, a memory 152, and a communication bus 153 configured to connect the processor 151 and the memory 152. The memory 152 may be a storage medium storing at least one of the first beam recovery program or the second beam recovery program described above.

If the memory 152 stores the first beam recovery program, the processor 151 may read the first beam recovery program, compile the first beam recovery program, and execute the first beam recovery program, to implement the steps of the beam recovery method in embodiment one or two described above. If the memory 152 stores the second beam recovery program, the processor 151 may read the second beam recovery program, compile the second beam recovery program, and execute the second beam recovery program, to implement the steps of the beam recovery method in embodiment three described above. For details for implementing the beam recovery method by the terminal 15, refer to the description of the embodiments above. The details are not repeated here.

Figure 16:
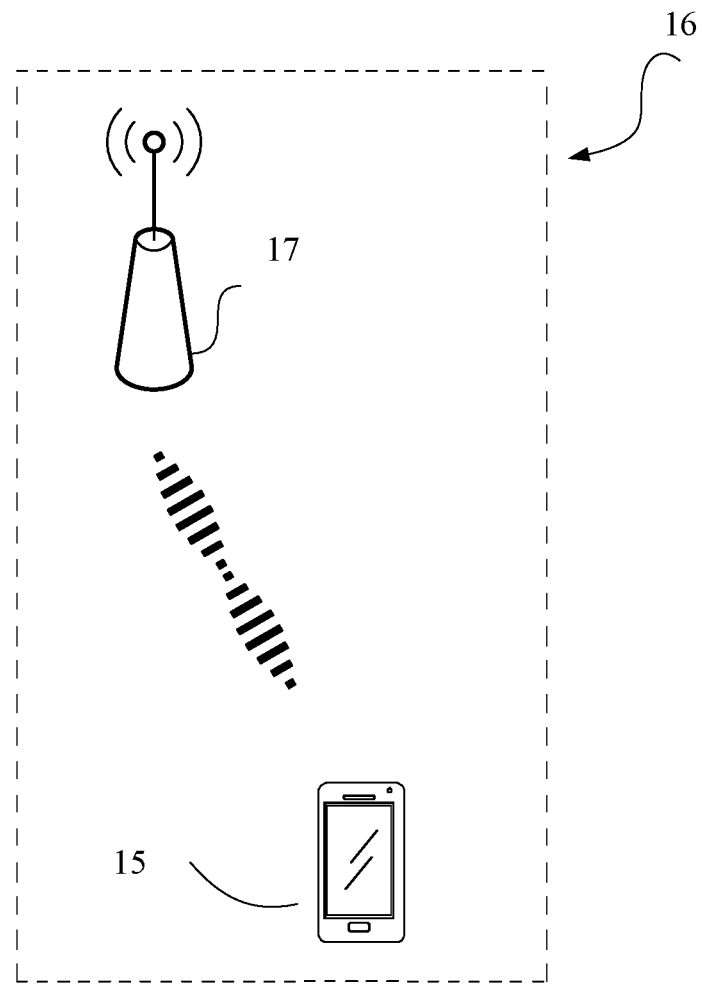
FIG. 16 is a schematic diagram of a communication system according to embodiment seven of the present disclosure.

This embodiment further provides a communication system. Referring to FIG. 16, the communication system 16 includes a terminal 15 and a base station 17. The terminal 15 may be the terminal in FIG. 15. The terminal 15 may implement the beam recovery methods in the embodiments described above, thereby implementing a beam recovery on the basis of a BWP switch and re-establishing a beam link with the base station 17 in the case of beam link blocking.

According to the terminal, the communication system and the storage medium of this embodiment of the present disclosure, in a beam recovery process, if it is determined that the processing of the current stage in the beam recovery process is unsuitable to be implemented on a currently active BWP, then the terminal may determine, according to a pre-configured switch mapping relationship, a target BWP corresponding to the currently active BWP and on which the processing of at least the current stage in the beam recovery process is suitable to be implemented. Then, the terminal switches to the target BWP by the BWP switch to implement the current process in the beam recovery on the target BWP. In this way, by combining the beam recovery with the BWP switch, the terminal can still implement the beam recovery on the basis of the BWP switch even in the case where there is a part of BWPs on which the beam recovery process is unable to be independently implemented, thus ensuring the quality of communications between the terminal and a base station.

It may be understood by those of ordinary skill in the art that the beam recovery methods and apparatuses, the storage medium, the terminal and the communication system provided in the various embodiments of the present disclosure may be applied to not only a 5G communication system, but also multiple future communication systems.

In the present application, if not in collision, the features of the various embodiments may be combined with each other and used in the same embodiment.

Apparently, those of ordinary skill in the art should understand that all or part of the steps of the method and functional modules/units in the system or the apparatuses disclosed above may be implemented as software (which may be implemented as computer program codes executable by a computing apparatus), firmware, hardware, and appropriate combinations thereof. In the hardware implementation, the division of the functional modules/units mentioned in the above description may not correspond to the division of physical components. For example, one physical component may have several functions, or one function or step may be executed jointly by several physical components. Some or all physical components may be implemented as software executable by a processor such as a central processor, a digital signal processor or a microcontroller, may be implemented as hardware, or may be implemented as integrated circuits such as application-specific integrated circuits. Such software may be distributed on a computer-readable medium and executed by a computing apparatus. Moreover, in some cases, the steps illustrated or described herein may be performed in a different order from the order described herein. The computer-readable medium may include a computer storage medium (or a non-transitory medium) and a communication medium (or a transitory medium). As is known to those of ordinary skill in the art, the term computer storage media include volatile and non-volatile as well as removable and non-removable media implemented in multiple methods or technologies for storing information (such as computer-readable instructions, data structures, program modules or other data). The computer-storage medium includes, but is not limited to, a random access memory (RAM), a read-only memory (ROM), an electrically erasable programmable read-only memory (EEPROM), a flash memory or another memory technology, a portable compact disc read-only memory (CD-ROM), a digital video disk (DVD) or other optical disc storage, a magnetic cassette, a magnetic tape, disk storage or another magnetic storage apparatus, or another medium used for storing the desired information and can be accessed by a computer. Additionally, it is known to those of ordinary skill in the art that the communication media generally includes computer-readable instructions, data structures, program modules or other data in modulated data signals such as carrier waves or other transmission mechanisms, and may include multiple information delivery media. Therefore, the present disclosure is not limited to any particular combination of hardware and software.

What is claimed is:

1. A beam recovery method, comprising:
in a beam recovery process comprising a plurality of stages, in response to processing of a current stage in the beam recovery process being unsuitable to be implemented on an active bandwidth part (BWP), determining a BWP set on which the processing of the current stage is suitable to be implemented from a plurality of pre-configured BWP sets, wherein processing of each stage of the plurality of stages is suitable to be implemented on a respective one BWP set of the plurality of pre-configured BWP sets; and determining a target BWP of the current stage from the BWP set on which the processing of the current stage is suitable to be implemented according to the active BWP and a switch mapping relationship, wherein the switch mapping relationship is between the active BWP and BWPs in the BWP set on which the processing of the current stage is suitable to be implemented; and
switching to the target BWP to perform the processing of the current stage in the beam recovery process.

2. The method of claim 1, before determining the target BWP of the current stage according to the active BWP and the switch mapping relationship, the method further comprising:
determining a first BWP set for the plurality of stages and a second BWP set for the plurality of stages, wherein the first BWP set comprises a first subset for the current stage and the processing of the current stage is suitable to be implemented on each of a plurality of BWPs in the first subset; and the second BWP set comprises a second subset for the current stage and the processing of the current stage is unsuitable to be implemented on each of a plurality of BWPs in the second subset; and
determining a switch mapping relationship between the plurality of BWPs in the second subset and the plurality of BWPs in the first subset;
wherein in response to the processing of the current stage in the beam recovery process being unsuitable to be implemented on the active BWP, determining the BWP set on which the processing of the current stage is suitable to be implemented from the plurality of pre-configured BWP sets; and determining the target BWP of the current stage from the BWP set on which the processing of the current stage is suitable to be implemented according to the active BWP and the switch mapping relationship comprises:
in response to the active BWP belonging to the second subset, determining the target BWP corresponding to the active BWP from the plurality of BWPs in the first subset according to the active BWP and the switch mapping relationship between the plurality of BWPs in the second subset and the plurality of BWPs in the first subset.

3. The method of claim 2, wherein determining the first BWP set for the plurality of stages and the second BWP set for the plurality of stages comprises:
for at least two stages of the plurality of stages in the beam recovery process, determining at least one of a respective first subset or a respective second subset corresponding to each of the at least two stages.

4. The method of claim 2, wherein each BWP in the first BWP set is a BWP on which processing of at least one stage in the beam recovery process is suitable to be implemented.

5. The method of claim 2, wherein each BWP in the second BWP set is a BWP on which processing of at least one stage in the beam recovery process is unsuitable to be implemented.

6. The method of claim 1, wherein the processing of the current stage in the beam recovery process being unsuitable to be implemented on the active BWP comprises:
the processing of the current stage in the beam recovery process being unable to be independently completed on the active BWP; or
the processing of the current stage in the beam recovery process being able to be independently completed on the active BWP, a processing effect not meeting a preset performance requirement.

7. The method of claim 1, wherein the plurality of stages of the beam recovery process comprises at least two of a beam failure monitoring stage, a target beam selection stage, a target beam report stage or a recovery response detection stage.

8. The method of claim 7, wherein in response to the current stage being the beam failure monitoring stage, the processing of the current stage in the beam recovery process being unsuitable to be implemented on the active BWP, the active BWP being configured with a part of reference signals required to be detected at the beam failure monitoring stage, and in a case of determining that a quality of the part of the reference signals sent on the active BWP is less than a quality threshold, switching to the target BWP.

9. The method of claim 1, further comprising:
in response to the processing of the current stage in the beam recovery process being suitable to be implemented on the active BWP, performing the beam recovery process on the active BWP.

10. A non-transitory storage medium, which stores a first beam recovery program, wherein the first beam recovery program is executable by one or more processors to implement the method of claim 1.

11. A terminal, comprising a processor, a memory and a communication bus; wherein
the communication bus is configured to implement a connection and communication between the processor and the memory; and
the processor is configured to execute a first beam recovery program stored in the memory, to implement:
in a beam recovery process comprising a plurality of stages, in response to processing of a current stage in the beam recovery process being unsuitable to be implemented on an active bandwidth part (BWP), determining a BWP set on which the processing of the current stage is suitable to be implemented from a plurality of pre-configured BWP sets, wherein processing of each stage of the plurality of stages is suitable to be implemented on a respective one BWP set of the plurality of pre-configured BWP sets; and determining a target BWP of the current stage from the BWP set on which the processing of the current stage is suitable to be implemented according to the active BWP and a switch mapping relationship, wherein the switch mapping relationship is between the active BWP and BWPs in the BWP set on which the processing of the current stage is suitable to be implemented; and switching to the target BWP to perform the processing of the current stage in the beam recovery process.

12. The terminal of claim 11, wherein the processor is configured to implement:

determining a first BWP set for the plurality of stages and a second BWP set for the plurality of stages, wherein the first BWP set comprises a first subset for the current stage and the processing of the current stage is suitable to be implemented on each of a plurality of BWPs in the first subset; and the second BWP set comprises a second subset for the current stage and the processing of the current stage is unsuitable to be implemented on each of a plurality of BWPs in the second subset; and determining a switch mapping relationship between the plurality of BWPs in the second subset and the plurality of BWPs in the first subset;

wherein in response to the processing of the current stage in the beam recovery process being unsuitable to be implemented on the active BWP, determining the BWP set on which the processing of the current stage is suitable to be implemented from the plurality of pre-configured BWP sets; and determining the target BWP of the current stage from the BWP set on which the processing of the current stage is suitable to be implemented according to the active BWP and the switch mapping relationship comprises:

in response to the active BWP belonging to the second subset, determining the target BWP corresponding to the active BWP from the plurality of BWPs in the first subset according to the active BWP and the switch mapping relationship between the plurality of BWPs in the second subset and the plurality of BWPs in the first subset.

13. The terminal of claim 12, wherein the processor is configured to determine the first BWP set for the plurality of stages and the second BWP set for the plurality of stages in the following manner:

for at least two stages of the plurality of stages in the beam recovery process, determining at least one of a respective first subset or a respective second subset corresponding to each of the at least two stages.

14. The terminal of claim 12, wherein each BWP in the first BWP set is a BWP on which processing of at least one stage in the beam recovery process is suitable to be implemented.

15. The terminal of claim 12, wherein each BWP in the second BWP set is a BWP on which processing of at least one stage in the beam recovery process is unsuitable to be implemented.

16. The terminal of claim 11, wherein the processing of the current stage in the beam recovery process being unsuitable to be implemented on the active BWP comprises:

the processing of the current stage in the beam recovery process being unable to be independently completed on the active BWP; or the processing of the current stage in the beam recovery process being able to be independently completed on the active BWP, a processing effect not meeting a preset performance requirement.

17. The terminal of claim 11, wherein the plurality of stages of the beam recovery process comprises at least two of a beam failure monitoring stage, a target beam selection stage, a target beam report stage or a recovery response detection stage.

18. The terminal of claim 17, wherein in response to the current stage being the beam failure monitoring stage, the processing of the current stage in the beam recovery process being unsuitable to be implemented on the active BWP, the active BWP being configured with a part of reference signals required to be detected at the beam failure monitoring stage, and in a case of determining that a quality of the part of the reference signals sent on the active BWP is less than a quality threshold, switching to the target BWP.

19. The terminal of claim 11, wherein the processor is further configured to:

in response to the processing of the current stage in the beam recovery process being suitable to be implemented on the active BWP, perform the beam recovery process on the active BWP.

\* \* \* \* \*